US011023932B2

(12) United States Patent
Jain et al.

(10) Patent No.: US 11,023,932 B2
(45) Date of Patent: *Jun. 1, 2021

(54) MANAGING IMPRESSION OPPORTUNITIES FOR A SET OF CONTENT ITEMS ASSOCIATED WITH GOALS TO GUARANTEE ACHIEVEMENT OF THE GOALS WITHIN A SPECIFIED PERIOD OF TIME

(71) Applicant: Facebook, Inc., Menlo Park, CA (US)

(72) Inventors: Vishal Jain, Mountain View, CA (US); Rima Deodhar, Fremont, CA (US); Zhengyong Zhu, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 368 days.

This patent is subject to a terminal disclaimer.

(21) Appl. No.: 15/829,866

(22) Filed: Dec. 1, 2017

(65) Prior Publication Data

US 2019/0172100 A1 Jun. 6, 2019

(51) Int. Cl.
*G06Q 30/02* (2012.01)

(52) U.S. Cl.
CPC ..... *G06Q 30/0272* (2013.01); *G06Q 30/0273* (2013.01)

(58) Field of Classification Search
CPC .................. G06Q 30/0272; G06Q 30/0273
See application file for complete search history.

(56) References Cited

U.S. PATENT DOCUMENTS

| 5,848,396 | A | * | 12/1998 | Gerace | G06Q 30/02 |
| | | | | | 705/7.33 |
| 9,747,618 | B1 | * | 8/2017 | Reiss | G06Q 30/0275 |
| 2003/0074252 | A1 | * | 4/2003 | Chandler-Pepelnjak | |
| | | | | | G06Q 30/0255 |
| | | | | | 705/14.53 |
| 2009/0055241 | A1 | * | 2/2009 | Chen | G06Q 30/0201 |
| | | | | | 705/7.34 |
| 2010/0121694 | A1 | * | 5/2010 | Bharadwaj | G06Q 30/0241 |
| | | | | | 705/14.4 |
| 2010/0262499 | A1 | * | 10/2010 | Karlsson | G06Q 30/0276 |
| | | | | | 705/14.72 |

(Continued)

OTHER PUBLICATIONS

Niklas Karlsson, Applications of feedback control in online advertising, Jun. 17, 2013, IEEE 2013 American Control Conference, pp. 6008-6013.*

*Primary Examiner* — Arthur Duran
(74) *Attorney, Agent, or Firm* — Fenwick & West LLP

(57) ABSTRACT

An online system guarantees achievement of an impression goal and a reach goal associated with a set of content items received from a content-providing user of the online system within a period of time associated with the goals. To ensure that the goals are achieved within the period of time, the online system may adjust values of filters associated with the set of content items that control a number of impression opportunities for which the set of content items will be eligible for presentation to users of the online system. The online system may compute a normalized ratio throughout the period of time associated with the goals based on the goals and the progress made by the online system towards achieving the goals. Based on the normalized ratio, the online system may track the performance of the content items and adjust the values of the filters.

23 Claims, 6 Drawing Sheets

(56) References Cited

U.S. PATENT DOCUMENTS

| | | | |
|---|---|---|---|
| 2011/0166927 A1* | 7/2011 | Bandi | G06Q 30/0246 |
| | | | 705/14.45 |
| 2013/0246161 A1* | 9/2013 | Zien | G06Q 30/02 |
| | | | 705/14.43 |
| 2014/0006170 A1* | 1/2014 | Collette | G06Q 30/0277 |
| | | | 705/14.71 |
| 2014/0095324 A1* | 4/2014 | Cabral | G06Q 30/08 |
| | | | 705/14.71 |
| 2015/0332349 A1* | 11/2015 | Els | G06Q 30/0244 |
| | | | 705/14.71 |
| 2016/0042407 A1* | 2/2016 | Els | G06Q 30/0275 |
| | | | 705/14.71 |
| 2017/0323330 A1* | 11/2017 | Chittilappilly | G06N 20/00 |
| 2018/0108049 A1* | 4/2018 | Kitts | G06Q 30/0272 |

* cited by examiner

MANAGING IMPRESSION OPPORTUNITIES FOR A SET OF CONTENT ITEMS ASSOCIATED WITH GOALS TO GUARANTEE ACHIEVEMENT OF THE GOALS WITHIN A SPECIFIED PERIOD OF TIME

BACKGROUND

This disclosure relates generally to online systems, and more specifically to managing impression opportunities for a set of content items associated with goals to guarantee achievement of the goals within a specified period of time.

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for content-providing users to share content by creating content items (e.g., advertisements) for presentation to additional online system users. For example, content-providing users may share photos or videos they have uploaded by creating content items that include the photos or videos that are presented to additional users to whom they are connected in the online system. By allowing content-providing users to create content items for presentation to additional online system users, an online system also provides abundant opportunities to persuade online system users to take various actions and/or to increase awareness about products, services, opinions, or causes among online system users. For example, if a content-providing user of the online system who volunteers for a non-profit organization creates a content item encouraging additional online system users to volunteer for the non-profit organization, the online system may present the content item to these additional online system users.

To encourage content-providing users of an online system to create content items for presentation to additional online system users, online systems may "pace" the presentation of the content items in order to increase their effectiveness. For example, suppose that an advertiser has created an advertisement that is to be presented to users of an online system over the course of a month and that the advertiser has allocated a budget for this purpose. To increase the likelihood that the advertisement is presented to the greatest number of potential customers, rather than presenting the advertisement to users as frequently as possible at the beginning of the first day of the month until the budget has been spent, the online system may present the advertisement to users at a more even pace over the course of each day during the month until the budget has been spent.

Online systems also may encourage content-providing users of an online system to create content items for presentation to additional online system users by guaranteeing the content-providing users that various goals associated with content items received from the content-providing users will be achieved within a specified period of time. For example, an online system may guarantee an advertiser from whom a set of advertisements associated with an advertising campaign was received that the set of advertisements will achieve an impression goal of at least 700 impressions within a specified week (e.g., the online system guarantees it will present the set of advertisements at least 700 times within the specified week). In this example, the online system also may guarantee the advertiser that the set of advertisements will achieve a reach goal of at least 300 online system users within the specified week (e.g., the online system guarantees it will present the set of advertisements to at least 300 different online system users within the specified week).

To achieve one or more goals associated with a set of content items within a specified period of time while pacing the presentation of the content items, an online system may adjust a frequency with which the content items are presented to users of the online system on a daily basis. In the above example, each day during the specified week, the online system may compare the impression goal of 700 impressions to the number of impressions achieved by the set of advertisements. Based on the comparison, the online system may adjust the frequency with which the advertisements are presented to users of the online system (e.g., by increasing the frequency if the current rate at which the impressions are being achieved indicates that the goal will not be achieved by the end of the week or by decreasing the frequency if the current rate indicates that over-achievement of the goal will occur at the end of the week). Similarly, in the above example, each day during the specified week, the online system also may compare the reach goal of 300 online system users to the number of different online system users who have been presented with one or more of the set of advertisements. Based on the comparison, the online system may adjust the frequency with which the advertisements are presented to users of the online system who have not been presented with any of the set of advertisements.

However, the number of opportunities that an online system may identify to present content to users of the online system often fluctuates. Therefore, adjusting the frequency with which content items are presented to users in the manner described above may lead to under-achievement of goals associated with the content items, which may discourage content-providing users from creating more content items for presentation to additional online system users. For example, suppose that a set of content items is associated with a reach goal that an online system has guaranteed will be achieved within a specified month. In this example, if the reach goal has not yet been achieved by the last day of the month, even if the online system has increased the frequency with which the set of content items will be presented to users of the online system who have not been presented with the content items, if the number of impression opportunities for these users is smaller than normal, the online system may fail to achieve the reach goal by the end of the month. Similarly, adjusting the frequency with which content items are presented to users of an online system in the manner described above also may lead to over-achievement of a goal, which may result in wasted opportunities that the online system may have used to present content items that are more likely to be relevant to users of the online system. In the above example, if the number of impression opportunities for the users is larger than normal, over-achievement of the reach goal may occur at the end of the month.

Moreover, over-achievement of a goal may be more likely to occur for content items that are associated with multiple goals that online systems have guaranteed will be achieved within the same period of time. Once a goal associated with a set of content items is achieved, an online system may adjust the frequency with which the content items are presented to users of the online system to focus on other goals associated with the content items that have not yet been achieved. For example, suppose that a set of content items is associated with an impression goal and a reach goal that the online system has guaranteed will be achieved within a week and prior to the end of the week, the impression goal has been achieved, but the reach goal has not yet been achieved. In this example, the online system may stop presenting the content items to users of the online system who already have been presented with any of the content items, but may increase the frequency with which the content items are presented to users who have not been presented with any of the content items. Continuing with this example, since the online system must still present the content items to users of the online system who have not been presented with any of the content items in order to achieve the reach goal, over-achievement of the impression goal is necessary in order to achieve the reach goal.

SUMMARY

An online system, such as an online advertising system, guarantees achievement of an impression goal (e.g., a number of impressions) and a reach goal (e.g., a number of unique online system users for whom impressions are achieved) associated with a set of content items received from a content-providing user of the online system (e.g., a set of advertisements associated with an advertising campaign) within a specified period of time. For example, the online system may guarantee an advertiser that a set of advertisements received from the advertiser will achieve at least 1,000 impressions within a specified week based on an impression goal associated with the set of advertisements and will be presented to at least 300 different online system users within that week based on a reach goal associated with the set of advertisements. In various embodiments, the online system also may guarantee achievement of other types of goals as well, such as a conversion goal (e.g., a number of purchases made in association with presentations of the set of content items), a click goal (e.g., a number of clicks on the set of content items), a "like" goal (e.g., a number of online system users who have expressed a preference for the set of content items), etc.

To ensure that the goals are achieved within the period of time guaranteed by the online system, the online system may set and adjust values of an impression filter and a reach filter associated with the set of content items. The value of each filter may control a number of impression opportunities for which one or more content items included among the set of content items will be eligible for presentation to viewing users of the online system. In embodiments in which the online system has guaranteed achievement of other types of goals associated with the set of content items, the online system may set and adjust a filter corresponding to each of these goals (e.g., a conversion filter, a click filter, etc.).

In some embodiments, values of the filters may correspond to probabilities. For example, suppose that the value of an impression filter associated with a set of content items corresponds to a probability of 10% (i.e., 0.1) and that a value of a reach filter associated with the set of content items corresponds to a probability of 80% (i.e., 0.8). In this example, upon identifying an opportunity to present content to a viewing user of the online system, the online system may determine whether any of these content items previously were presented to the viewing user (e.g., based on information stored in the online system describing previous presentations of content items to online system users, as described below). Continuing with this example, if any of the content items previously were presented to the viewing user, the online system may identify one or more content items included among the set of content items as candidate content items eligible for presentation to the viewing user based on the impression filter associated with the content items, such that there is a 10% probability that the online system may identify any of the content items as candidate content items. Alternatively, in the above example, if none of the content items previously were presented to the viewing user, the online system may identify one or more of the content items included among the set of content items as candidate content items eligible for presentation to the viewing user based on the reach filter associated with the content items, such that there is an 80% probability that the online system may identify any of the content items as candidate content items.

Values of the filters associated with the set of content items may be set by the online system at the beginning of one or more time intervals within the period of time in which the goals are to be achieved. For example, suppose that the online system has guaranteed achievement of a reach goal and an impression goal associated with a set of content items by the end of a specified week. In this example, the online system may set values of an impression filter and a reach filter associated with the set of content items at the beginning of the week or at the beginning of each day within the week. In some embodiments, the online system may set the values of the filters to base values. For example, if values of impression and reach filters associated with a set of content items correspond to probabilities, the online system may set the values of both filters to a base value of 1 at the beginning of a period of time in which an impression goal and a reach goal associated with the content items are to be achieved. In the above example, the online system also may set the values of both filters to the base value of 1 at the beginning of each day within the period of time in which the goals are to be achieved.

In alternative embodiments, the online system may determine the values of the filters and set the values accordingly. For example, if a large number of impressions of a set of content items and/or a large number of unique online system users are to be presented with the content items within a short period of time, the online system may determine higher values of a reach filter and/or an impression filter associated with the content items than if a smaller number of impressions and/or a smaller number of unique online system users are to be presented with the set of content items within a longer period of time. As an additional example, the online system may set the values of an impression filter and a reach filter associated with a set of content items at the beginning of a period of time in which impression and reach goals associated with the content items are to be achieved based on historical impression and reach frequencies for content items associated with similar targeting criteria and bid amounts during time periods of similar length to the period of time in which the goals are to be achieved.

Upon presenting a content item included among the set of content items to a viewing user of the online system during the period of time in which the goals are to be achieved, the online system may receive information describing the presentation. Examples of information describing a presentation of a content item may include user-identifying information for a viewing user of the online system to whom the content item was presented (e.g., an IP address associated with the user, a username or a user ID associated with the user, etc.), information identifying the content item that was presented, information describing one or more goals associated with the content item, and information indicating a date and a time at which the content item was presented (e.g., in a timestamp). In embodiments in which the online system guarantees achievement of a different type of goal, the online system may receive information describing each event associated with the goal. For example, if a content item is associated with a conversion goal, the online system may receive information describing each conversion associated with the content item. In some embodiments, the online system may store the information describing the presentations of the set of content items and/or information describing other types of events associated with each goal associated with the set of content items.

The online system may track its progress towards achieving the goals based on the information describing the presentations of the content items. For example, if a set of content items is associated with an impression goal and a reach goal, the online system may keep track of a number of impressions achieved by the set of content items and a number of unique online system users for whom the impressions were achieved. The online system may track its progress towards achieving the goals by maintaining a count associated with each goal. In some embodiments, the online system may maintain an impression count associated with the impression goal, in which the impression count is incremented upon each impression achieved by a content item included among the set of content items within the period of time associated with the goals. For example, each time the online system receives information describing a presentation of a content item associated with an impression goal to a viewing user of the online system within a period of time associated with the impression goal, the online system may increment an impression count associated with the impression goal.

In some embodiments, the online system also may track the reach achieved by the set of content items by maintaining a reach count associated with the reach goal, in which the reach count is incremented upon each impression achieved by a content item included among the set of content items for a unique user of the online system within the period of time associated with the goals. In the above example, if the content item also is associated with a reach goal to be achieved within the same period of time, upon incrementing the impression count associated with the impression goal, the online system may determine whether this content item or any other content item associated with the reach goal previously was presented to the viewing user (e.g., based on user-identifying information included among information received by the online system describing previous presentations of content items to online system users). Continuing with this example, if none of the content items associated with the reach goal previously were presented to the viewing user, the online system also may increment a reach count associated with the reach goal. In embodiments in which the online system guarantees achievement of a different type of goal, the online system may track its progress towards achieving the goal using similar methods (e.g., by maintaining a conversion count, a click count, etc.).

During the period of time in which the goals associated with the set of content items are to be achieved, the online system may track the performance of the content items by computing one or more normalized ratios based on the goals and on the progress made by the online system towards achieving the goals. The online system may compute the normalized ratios at periodic time intervals during the period of time in which the goals are to be achieved (e.g., once every hour). In some embodiments, the online system may compute a normalized ratio as a ratio of an achievement ratio to a goal ratio. For example, if an achievement ratio has a value of 1 and a goal ratio has a value of 0.33, a normalized ratio may be computed to have a value of 3 (i.e., 1/0.33). The online system may compute a goal ratio to be a ratio of the reach goal to the impression goal. For example, if a reach goal associated with a set of content items is to present the content items to at least 500 different online system users and an impression goal associated with the set of content items is to achieve at least 1,000 impressions of the content items, a goal ratio may be computed to have a value of 0.5 (i.e., 500/1,000). Similarly, the online system may compute an achievement ratio as a ratio of the achieved reach to the achieved impressions. In the above example, if a reach count associated with the reach goal indicates that the set of content items has been presented to 200 different online system users and an impression count associated with the impression goal indicates that the content items have achieved 600 impressions, an achievement ratio may be computed to have a value of 0.33 (i.e., 200/600).

In alternative embodiments, the online system may compute a normalized ratio in a different manner. In embodiments in which the online system guarantees achievement of a different type of goal, the online system may compute a normalized ratio based on the type of goal and on the progress made by the online system towards achieving the corresponding type of goal. In some embodiments, at least some of the ratios may be expressed as inverses of the ratios described above (e.g., a normalized ratio may be computed as a ratio of a goal ratio to an achievement ratio, an achievement ratio may be computed as a ratio of the achieved impressions to the achieved reach, and/or a goal ratio may be computed as a ratio of an impression goal to a reach goal).

In some embodiments, once the online system has computed one or more normalized ratios, the online system may plot each normalized ratio as a function of time on a graph. For example, if the online system computes a normalized ratio at a particular time, the online system may plot a point on a two-dimensional graph, in which the point has a y-coordinate corresponding to the normalized ratio and an x-coordinate corresponding to the time at which the normalized ratio was computed. In this example, a point corresponding to each normalized ratio subsequently computed by the online system also may be plotted on the same graph.

The graph on which one or more normalized ratios have been plotted also may include one or more curves corresponding to threshold values associated with the impression goal and the reach goal associated with the set of content items. In some embodiments, these curves may include a reach over-delivery curve that corresponds to a trend of normalized ratios that may result in achievement of the reach goal, but not the impression goal within the period of time associated with the goals. These curves also may include an impression over-delivery curve that corresponds to a trend of normalized ratios that may result in achievement of the impression goal, but not the reach goal within the period of time associated with the goals. In embodiments in which the set of content items are associated with other types of goals, the curves also may include other types of over-delivery curves corresponding to threshold values associated with the types of goals (e.g., a conversion over-delivery curve, a click over-delivery curve, etc.).

The graph on which one or more normalized ratios have been plotted also may include a target curve and a tolerance threshold curve corresponding to additional threshold values associated with the goals. A target curve may correspond to a trend of normalized ratios that may result in achievement of the impression goal and the reach goal (or any other types of goals associated with the set of content items) within the period of time associated with the goals. In various embodiments, the over-delivery curves (e.g., the reach over-delivery curve and the impression over-delivery curve) and the target curve intersect at a point corresponding to the end of the period of time in which the goals are to be achieved. In embodiments in which the graph also includes a tolerance threshold curve, points along the tolerance threshold curve may correspond to a trend of normalized ratios that may result in an over-achievement of a goal within the period of time associated with the goals that is tolerated. For example, if a set of content items is associated with a reach goal and an impression goal, since it is often more difficult to achieve reach goals than impression goals, a tolerance threshold curve may indicate that achievement of a greater reach than is required by the reach goal will be tolerated to ensure that the reach goal is achieved.

In some embodiments, the online system may generate one or more of the curves corresponding to threshold values associated with the goals associated with the set of content items. For example, in a two-dimensional graph, in which the x-axis represents time and the y-axis represents normalized ratios, the online system may designate a point having the coordinates (1, 1) to correspond to the end of a period of time associated with a reach goal and an impression goal associated with a set of content items at which both goals have been achieved (i.e., a normalized ratio of 1 at time t=1). In this example, since a target curve generated by the online system will have a normalized ratio of 1 at all times during the period of time associated with the goals, the target curve will correspond to a straight line having an equation of $y=1$.

In some embodiments, the online system may generate one or more of the curves based on historical data maintained in the online system (e.g., historical impression data and/or historical reach data). Continuing with the above example, the online system also may generate lines corresponding to a reach over-delivery curve and an impression over-delivery curve that intersect the target curve at the point corresponding to the end of the period of time in which the goals are to be achieved (i.e., (1,1)). In this example, the online system may determine a y-intercept and/or a slope of the impression over-delivery curve and the reach over-delivery curve based on historical impression and reach data for various content items having at least a threshold measure of similarity to the set of content items during time intervals that are the same as or similar to the period of time associated with the goals. In the above example, the online system also may predict a threshold normalized ratio at which a likelihood that the reach goal will be achieved by the end of the period of time associated with the goals is at least a threshold likelihood (e.g., based on the historical reach data). In this example, if the online system predicts the threshold normalized ratio to be 1.1, the online system may generate a tolerance threshold curve that is a straight line having an equation of $y=1.1$. In some embodiments, the online system also may generate one or more of the curves using a machine-learning model. In the above examples, the online system may train a machine-learning model using the historical impression and reach data and subsequently generate one or more of the curves using the model.

Upon computing each normalized ratio, the online system may determine whether the values of one or more filters associated with the set of content items should be adjusted in order to achieve the goals associated with the content items within the period of time guaranteed by the online system. In some embodiments, the online system may make this determination by comparing a point on a graph corresponding to the current normalized ratio to one or more curves on the graph corresponding to threshold values associated with the goals. In such embodiments, if the point on the graph corresponding to the current normalized ratio is on one side of a reach over-delivery curve and an impression over-delivery curve, the online system may determine that the values of the reach filter and/or the impression filter should be adjusted to one or more base values. For example, suppose that a point on a graph corresponding to a current normalized ratio is on one side of an impression over-delivery curve and a reach over-delivery curve and is closer to a point along the reach over-delivery curve corresponding to a current time than to a point along the impression over-delivery curve corresponding to the current time. In this example, if values of filters correspond to probabilities, the online system may determine that the value of a reach filter associated with a set of content items should be adjusted to a base value of 0 and that the value of an impression filter associated with the set of content items should be adjusted to a base value of 1. Conversely, suppose that a point on a graph corresponding to a current normalized ratio is on one side of an impression over-delivery curve and a reach over-delivery curve and is closer to a point along the impression over-delivery curve corresponding to a current time than to a point along the reach over-delivery curve corresponding to the current time. In this example, if values of filters also correspond to probabilities, the online system may determine that the value of a reach filter associated with a set of content items should be adjusted to a base value of 1 and that the value of an impression filter associated with the set of content items should be adjusted to a base value of 0. In embodiments in which the set of content items is associated with other types of goals, the online system may determine whether the values of the corresponding filters should be adjusted to one or more base values in an analogous manner. Furthermore, in embodiments in which the online system has determined that the values of one or more filters should be adjusted to one or more base values, the online system may adjust the values accordingly.

If a point on a graph corresponding to a current normalized ratio is between an over-delivery curve and a target curve, the online system may determine whether the current normalized ratio is improving (i.e., approaching the target curve) or deteriorating (i.e., deviating from the target curve). The online system may do so by comparing the point to a point corresponding to an additional normalized ratio that previously was computed for the set of content items. For example, suppose that at time t=0.2, the normalized ratio is computed to be 1.1, such that a point on a graph corresponding to this first normalized ratio has the coordinates (0.2, 1.1) and that subsequently, at time t=0.25, the normalized ratio is computed to be 1.3, such that a point on the graph corresponding to this second normalized ratio has the coordinates (0.25, 1.3). In this example, if the online system determines that the point corresponding to the second normalized ratio is between a target curve having an equation of $y=1$ and a reach over-delivery curve, the online system may then determine that the normalized ratio is deteriorating by comparing the coordinates of this point to the coordinates of the point corresponding to the first normalized ratio and to the target curve. As an additional example, suppose that at time t=0.1, the normalized ratio is computed to be 1.4, such that a point on a graph corresponding to this first normalized ratio has the coordinates (0.1, 1.4) and that subsequently, at time t=0.15, the normalized ratio is computed to be 1.3, such that a point on the graph corresponding to this second normalized ratio has the coordinates (0.15, 1.3). In this example, if the online system determines that the point corresponding to the second normalized ratio is between a target curve having an equation of y=1 and a reach over-delivery curve, the online system may then determine that the normalized ratio is improving by comparing the coordinates of this point to the coordinates of the point corresponding to the first normalized ratio and to the target curve.

The online system may determine whether the value of a filter associated with the set of content items needs to be adjusted based at least in part on whether the normalized ratio is improving or deteriorating. In embodiments in which the online system has determined that the normalized ratio is deteriorating, the online system may determine that the value of a filter associated with the set of content items needs to be adjusted. In embodiments in which the online system has determined that the normalized ratio is improving, the online system may determine whether the value of a filter associated with the set of content items needs to be adjusted based at least in part on a trend of points corresponding to normalized ratios computed by the online system. For example, the online system may plot multiple points corresponding to the current normalized ratio and normalized ratios previously computed by the online system and generate a "trend line" that best fits the points. In this example, if the trend line intersects the target curve at a point along the trend line corresponding to the end of a period of time in which an impression goal and a reach goal are to be achieved, the online system may determine that the values of the corresponding filters do not need to be adjusted. In some embodiments, the online system also may determine whether the value of a filter associated with the set of content items needs to be adjusted based at least in part on a tolerance threshold curve. In the above example, if a tolerance threshold allows for slight over-achievement of the reach goal and the trend line intersects a region bounded by a tolerance threshold curve corresponding to the tolerance threshold and the target curve at a point along the trend line corresponding to the end of the period of time associated with the goals, the online system also may determine that the values of the filters do not need to be adjusted. In the above examples, if the trend line does not intersect the target curve or does not intersect the region bounded by the tolerance threshold curve and the target curve at the point along the trend line corresponding to the end of the period of time associated with the goals, the online system may determine that the value of a filter associated with the set of content items needs to be adjusted.

In embodiments in which the online system has determined that the normalized ratio is deteriorating or that the normalized ratio is improving, but that the value of a filter associated with the set of content items needs to be adjusted, the online system may identify a filter having a value that needs to be adjusted. In some embodiments, the online system may do so by comparing a distance between a point on the graph corresponding to the current normalized ratio and a point along each of the over-delivery curves. For example, suppose that the online system has determined that the normalized ratio is deteriorating or that the normalized ratio is improving, but that the value of a filter associated with a set of content items needs to be adjusted. In this example, if a point on a graph corresponding to the current normalized ratio is closer to a point along a reach over-delivery curve corresponding to a current time than to a point along an impression over-delivery curve corresponding to the current time, the online system may identify the reach filter as the filter having the value that needs to be adjusted. Alternatively, in the above example, if the point on the graph corresponding to the current normalized ratio is closer to the point along the impression over-delivery curve corresponding to the current time than to the point along the reach over-delivery curve corresponding to the current time, the online system may identify the impression filter as the filter having the value that needs to be adjusted.

Once the online system has identified a filter having a value that needs to be adjusted, the online system may adjust the value of the filter to a value that would increase the likelihood that a normalized ratio that subsequently is computed by the online system will approach the target curve. In embodiments in which the online system has determined that the normalized ratio is improving and has identified a filter having a value that needs to be adjusted, the online system may determine an amount by which to adjust the value of the filter based at least in part on a complement of the current value of the filter. For example, if the online system has determined that the normalized ratio is improving, but that the value of a reach filter associated with a set of content items needs to be adjusted from its current value of 0.3, the online system may determine a complement of the current value of the reach filter (i.e., 1−0.3=0.7). In this example, the online system may add a fraction of the complement to the current value of the reach filter to obtain the new value of the reach filter. Continuing with this example, if the fraction of the complement is 10% (i.e., 0.1), the new value of the reach filter may be computed to be the following: new reach filter=current reach filter+((1−current reach filter)*fraction)=0.3+(0.7*0.1)=0.37. In the above example, the fraction of the complement may be set to a default value or may be determined by a machine-learning model. Furthermore, in the above example, if the online system had determined that the value of an impression filter or any other type of filter associated with the set of content items needed to be adjusted, the online system may adjust the value of the filter in an analogous manner.

In embodiments in which the online system has determined that the normalized ratio is deteriorating, once the online system has identified a filter having a value that needs to be adjusted, the online system may determine the amount by which to adjust the value of the filter based at least in part on a difference between the current normalized ratio and a threshold value corresponding to an over-delivery curve. For example, suppose that a point on a graph corresponding to a first normalized ratio has the coordinates (0.2, 1.1), a point on the graph corresponding to a second normalized ratio, which is the current normalized ratio, has the coordinates (0.25, 1.3), and the current value of a reach filter is 0.6. Suppose also that the online system has determined that the point corresponding to the second normalized ratio is between a target curve having an equation of y=1 and a reach over-delivery curve, that the normalized ratio is deteriorating, and that the value of a reach filter associated with a set of content items needs to be adjusted. In this example, the online system may determine coordinates at which a vertical line passing through the point corresponding to the second normalized ratio would intersect the reach over-delivery curve and the target curve (e.g., (0.25, 2.5) and (0.25, 1), respectively). In this example, the online system may then compute a weight based on the coordinates (e.g., weight=1−((y-coordinate of point−y-coordinate of reach over-delivery curve)/(y-coordinate of target curve−y-coordinate of reach over-delivery curve))=1−((1.3−2.5)/(1−2.5))=0.2). The online system may then adjust the current value of the reach filter (i.e., 0.6) to a new value based on the weight (e.g., new reach filter=minimum reach filter+weight*(current reach filter−minimum reach filter)=0+0.2*(0.6−0)=0.12. In the above example, if the online system had determined that the value of an impression filter or any other type of filter associated with the set of content items needed to be adjusted, the online system may adjust the value of the filter in an analogous manner.

In some embodiments, once a goal associated with the set of content items is achieved, the online system may adjust the value of a filter corresponding to the goal to a minimum value, such that the number of impression opportunities for which the online system will consider presenting one or more content items included among the set of content items to a viewing user of the online system may be minimized. For example, suppose that a set of content items is associated with an impression goal and a reach goal and that values of filters associated with the set of content items correspond to probabilities. In this example, once the impression goal is achieved, the online system may adjust the value of an impression filter associated with the set of content items to 0. In the above example, once the reach goal is achieved, the online system also may adjust the value of a reach filter associated with the set of content items to 0. Alternatively, in embodiments in which a tolerance threshold curve allows for slight over-achievement of a goal, a filter corresponding to the goal may remain the same or may be adjusted by a different amount (e.g., to a value between the current value and 0) once the goal is achieved.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
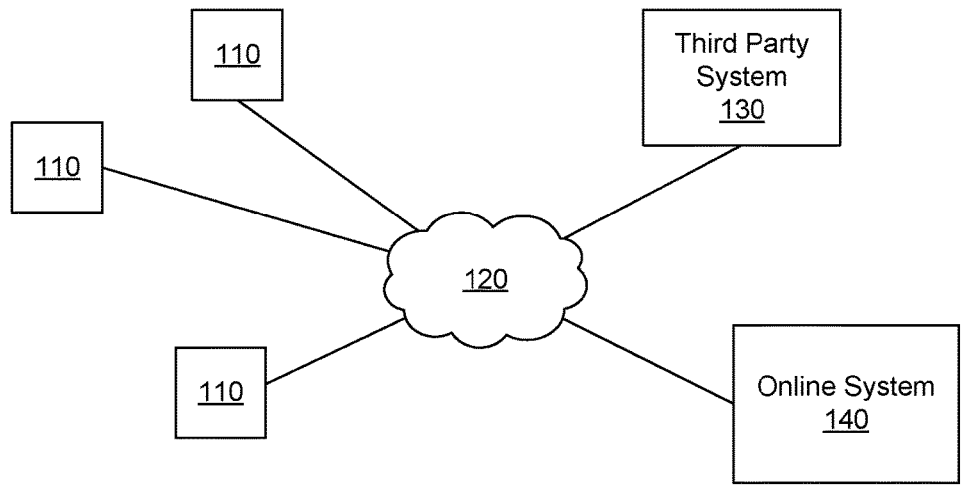
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
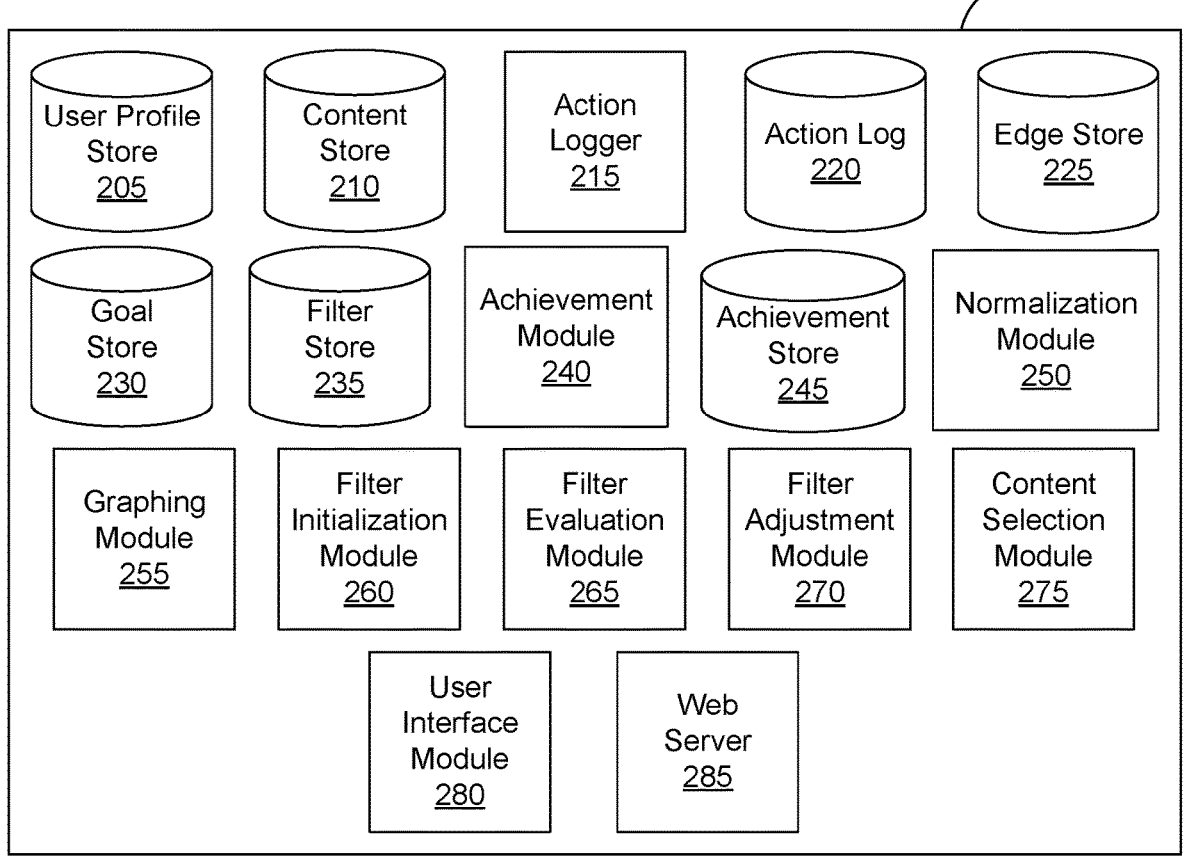
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a goal store 230, a filter store 235, an achievement module 240, an achievement store 245, a normalization module 250, a graphing module 255, a filter initialization module 260, a filter evaluation module 265, a filter adjustment module 270, a content selection module 275, a user interface module 280, and a web server 285. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more user attributes for the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

The user profile store 205 also may store user-identifying information associated with users of the online system 140. In some embodiments, user-identifying information associated with a user of the online system 140 may include personally identifiable information. Examples of personally identifiable information that may be associated with a user of the online system 140 may include a full name, a home address, a phone number, an email address, a user identifier (e.g., a username, a user identification number, or a cookie identifier), a client device identifier (e.g., an IP address), a browser identifier (e.g., a user agent), etc. User-identifying information also may include information that potentially may be combined with other personal information to identify a user of the online system 140 (e.g., an age, a gender, a geographic region, etc.).

While user profiles in the user profile store 205 are frequently associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The content store 210 may store (e.g., as shown in step 302 of FIG. 3) objects representing content items received from content-providing users of the online system 140. Each content item received from a content-providing user may be associated with various types of information that may be used to uniquely identify the content item. For example, a content item may be identified based on information identifying a content-providing user of the online system 140 from whom the content item was received and on a title or other unique identifier assigned to the content item by the content-providing user. As an additional example, a content item may be identified based on a unique identification number assigned by the online system 140 to each content item maintained in the online system 140. In the above examples, the information that may be used to uniquely identify each content item may be stored in association with an object representing the content item in the content store 210.

Each content item received from a content-providing user also may be associated with one or more goals and a period of time in which the online system 140 may guarantee that each goal will be achieved. For example, if a set of content items received from a content-providing user of the online system 140 is associated with a goal, the online system 140 may guarantee that the goal will be achieved within a specified period of time (e.g., within a specified week or within a specified month). In this example, information describing the goal associated with each content item included among the set of content items received from the content-providing user and the period of time in which the goal is to be achieved may be stored in association with an object representing the content item in the content store 210.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in the third-party system 130 that communicate information to the online system 140. Users may interact with various objects in the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In embodiments in which content items presented to users of the online system 140 are associated with various goals, the action log 220 may store (e.g., as shown in step 320 of FIG. 3) information describing the progress made by the online system 140 towards achieving one or more goals associated with a set of content items. For example, upon each presentation of a content item associated with an impression goal to a user of the online system 140, information received by the online system 140 describing the presentation may be stored in the action log 220 (e.g., by the action logger 215). As an additional example, if a content item is associated with a conversion goal, information describing each conversion associated with the content item received by the online system 140 may be stored in the action log 220 by the action logger 215.

Examples of information describing the progress made by the online system 140 towards achieving one or more goals associated with a content item may include user-identifying information for a viewing user of the online system 140 to whom the content item was presented or who performed an action associated with the content item (e.g., an IP address associated with the user, a username or a user ID associated with the user, etc.), information identifying the content item, information describing one or more goals associated with the content item, and information indicating a date and a time at which the content item was presented or a date and a time at which the user performed the action associated with the content item (e.g., in a timestamp). For example, upon presenting an advertisement associated with an impression goal to a user of the online system 140, the action logger 215 may receive an IP address associated with the viewing user, information identifying an advertising campaign associated with the advertisement, information indicating that the advertisement is associated with the impression goal, and a date and a time at which the advertisement was presented. In this example, the action logger 215 may store this information in the action log 220.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690,254 (U.S. Pat. No. 9,070,141, issued on Jun. 30, 2015), filed on Nov. 30, 2012, U.S. patent application Ser. No. 13/689,969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The goal store 230 stores (e.g., as shown in step 304 of FIG. 3) information describing goals associated with various sets of content items and a period of time associated with each goal. A goal may be associated with a set of content items received from a content-providing user of the online system 140 and a period of time in which the online system 140 may guarantee that the goal will be achieved. For example, a goal may be associated with a set of advertisements associated with an advertising campaign received from an advertiser or any other suitable content-providing user of the online system 140. In this example, the advertiser may specify a goal of 1,000 impressions of the set of advertisements and the online system 140 may guarantee that the goal will be achieved within a specified week. In embodiments in which a goal is associated with multiple content items, information describing the goal may be stored in the goal store 230 in association with information describing a period of time associated with the goal and information identifying each content item associated with the goal. In the above example, the online system 140 may store information describing the goal in the goal store 230 in association with information identifying the specified week and information identifying each content item associated with the goal.

A set of content items may be associated with various types of goals. In some embodiments, a set of content items may be associated with an impression goal. For example, to achieve an impression goal of 500 impressions, one or more content items included among a set of content items associated with the impression goal must be presented to one or more users of the online system 140 at least 500 times. In various embodiments, a set of content items may be associated with a reach goal. For example, to achieve a reach goal of 300 online system users, one or more content items included among a set of content items associated with the reach goal must be presented to at least 300 different users of the online system 140. A set of content items also may be associated with a conversion goal, a click goal, or any other suitable type of goal that may be achieved by the set of content items. For example, to achieve a conversion goal of 200 purchases, 200 purchases must be made by online system users in association with presentations of one or more content items included among a set of content items associated with the conversion goal. As an additional example, to achieve a click goal of 700 clicks, online system users must click on one or more content items included among a set of content items associated with the click goal at least 700 times. As yet another example, to achieve a "like" goal of 150 likes, 150 online system users must express a preference for one or more content items included among a set of content items associated with the like goal.

In some embodiments, a set of content items may be associated with multiple goals. In such embodiments, information describing each goal associated with the set of content items may be stored in the goal store 230 in association with information describing a period of time associated with the goal and information identifying each content item included among the set of content items. For example, suppose that a set of content items is associated with an impression goal and a reach goal. In this example, the online system 140 may store information describing the impression goal in the goal store 230 in association with information describing a period of time in which the impression goal is to be achieved and information identifying each content item included among the set of content items. Similarly, in this example, the online system 140 also may store information describing the reach goal in the goal store 230 in association with information describing a period of time in which the reach goal is to be achieved and information identifying each content item included among the set of content items. The goal store 230 is further described below in conjunction with FIG. 3.

The filter store 235 stores (e.g., as shown in step 310 of FIG. 3) values of filters associated with various sets of content items maintained in the online system 140 that are associated with one or more goals. For each goal associated with a set of content items, a value of a corresponding filter may be stored in the filter store 235. For example, if a set of content items is associated with an impression goal, each content item included among the set of content items may be associated with an impression filter. In this example, a value of the impression filter may be stored in the filter store 235. In the above example, if the set of content items also is associated with a reach goal, each content item included among the set of content items also may be associated with a reach filter. In this example, a value of the reach filter also may be stored in the filter store 235.

The value of each filter stored in the filter store 235 may control a number of impression opportunities for which one or more content items included among a set of content items associated with the filter will be eligible for presentation to users of the online system 140. In some embodiments, values of filters may correspond to probabilities. For example, suppose that the value of an impression filter associated with a set of content items corresponds to a probability of 10% (i.e., 0.1). In this example, upon identifying an opportunity to present content to a viewing user of the online system 140, there is a 10% probability that the content selection module 275 (described below) will identify one or more content items included among the set of content items as being eligible for presentation to the viewing user.

The value of a filter associated with a set of content items may be stored in association with information identifying the content items, information describing a corresponding goal associated with the content items, and information describing a period of time associated with the goal. For example, a value of an impression filter associated with a set of content items may be stored in the filter store 235 in association with information identifying each content item included among the set of content items, information describing a number of impressions that must be achieved by the set of content items based on an impression goal associated with the set of content items, and a period of time in which the online system 140 has guaranteed that the impression goal will be achieved. The filter store 235 is further described below in conjunction with FIG. 3.

The achievement module 240 identifies (e.g., as shown in step 322 of FIG. 3) information received by the online system 140 (e.g., by the action logger 215) describing progress made by the online system 140 towards achieving each goal associated with a set of content items within a period of time associated with the goal. For example, suppose that a set of content items is associated with an impression goal and that the action logger 215 receives information describing an impression achieved by a content item included among the set of content items for a viewing user of the online system 140. In this example, based on information identifying the content item included among the information received by the action logger 215, the achievement module 240 may access the goal store 230 or the content store 210 and retrieve information describing the impression goal and a period of time in which the impression goal is to be achieved. Continuing with this example, if the information describing the impression achieved by the content item was received by the action logger 215 at a time within the period of time in which the impression goal is to be achieved, the achievement module 240 may identify the information received by the action logger 215 as information describing progress made by the online system 140 towards achieving the impression goal.

In the above example, if the set of content items also is associated with a reach goal, the achievement module 240 also may retrieve information describing the reach goal and a period of time in which the reach goal is to be achieved from the goal store 230 or the content store 210. Continuing with this example, if the information describing the impression achieved by the content item was received by the action logger 215 at a time within the period of time in which the reach goal is to be achieved, the achievement module 240 also may access the action log 220 and determine whether any content items included among the set of content items previously were presented to the viewing user within the period of time (e.g., based on user-identifying information associated with the viewing user included among the information received by the action logger 215). In this example, if none of the set of content items previously were presented to the viewing user within the period of time in which the reach goal is to be achieved, the achievement module 240 also may identify the information received by the action logger 215 as information describing progress made by the online system 140 towards achieving the reach goal.

The achievement module 240 also may update (e.g., as shown in step 324 of FIG. 3) information describing progress made by the online system 140 towards achieving each goal associated with a set of content items within a period of time associated with the goal. The achievement module 240 may update information stored in the online system 140 (e.g., in the achievement store 245, described below), that describes progress made by the online system 140 towards achieving each goal associated with a set of content items during a period of time associated with the goal. In some embodiments, the achievement module 240 may do so by updating a count associated with each goal. In such embodiments, the achievement module 240 may increment a value of a count associated with a goal upon identifying information indicating that progress made by the online system 140 towards achieving the goal has been made within a period of time associated with the goal. For example, suppose that a set of content items is associated with an impression goal that the online system 140 has guaranteed will be achieved within a specified month. In this example, each time the achievement module 240 identifies information received by the action logger 215 describing progress made by the online system 140 towards achieving the impression goal during the specified month, the achievement module 240 may increment an impression count associated with the impression goal that is stored in the achievement store 245. In the above example, suppose that the content item also is associated with a reach goal that the online system 140 has also guaranteed will be achieved within the specified month. In this example, upon incrementing the impression count associated with the impression goal, if the achievement module 240 also identifies the information received by the action logger 215 as information describing progress made by the online system 140 towards achieving the reach goal, the achievement module 240 also may increment a reach count associated with the reach goal that is stored in the achievement store 245. The functionality of the achievement module 240 is further described below in conjunction with FIG. 3.

As described above in conjunction with the achievement module 240, in some embodiments, information stored in the achievement store 245 may include a count associated with each goal associated with a set of content items that describes progress made by the online system 140 towards achieving the goal during a period of time associated with the goal. For example, the achievement store 245 may store an impression count associated with an impression goal associated with a set of content items, in which a value of the impression count may indicate a number of impressions achieved by the set of content items during a period of time in which the impression goal is to be achieved. As an additional example, the achievement store 245 may store a reach count associated with a reach goal associated with a set of content items, in which a value of the reach count may indicate a number of unique online system users for whom impressions of the content items have been achieved during a period of time in which the reach goal is to be achieved. As yet another example, the achievement store 245 may store a conversion count associated with a conversion goal associated with a set of content items, in which a value of the conversion count may indicate a number of purchases that have been made by online system users in association with presentations of the content items during a period of time in which the conversion goal is to be achieved. The achievement store 245 is further described below in conjunction with FIG. 3.

The normalization module 250 computes (e.g., as shown in step 326 of FIG. 3) one or more normalized ratios used to track the performance of a set of content items associated with various goals. The normalization module 250 may compute the normalized ratios at periodic time intervals during a period of time in which the goals associated with the set of content items are to be achieved. For example, if a set of content items is associated with an impression goal and a reach goal that are to be achieved within a specified week, the normalization module 250 may compute a normalized ratio once every hour within the specified week. The normalization module 250 may compute a normalized ratio based on goals associated with a set of content items and on the progress made by the online system 140 towards achieving the goals. In some embodiments, the normalization module 250 may compute a normalized ratio as a ratio of an achievement ratio to a goal ratio. For example, if an achievement ratio has a value of 0.8 and a goal ratio has a value of 0.2, the normalization module 250 may compute a normalized ratio to have a value of 4 (i.e., 0.8/0.2).

The normalization module 250 may compute a goal ratio to be a ratio of one goal associated with a set of content items to another goal associated with the set of content items. For example, the normalization module 250 may access the goal store 230 to retrieve information describing a reach goal and an impression goal associated with a set of content items. In this example, if the reach goal associated with the set of content items is to present the content items to at least 500 different online system users and the impression goal associated with the set of content items is to achieve at least 1,000 impressions of the content items, the normalization module 250 may compute the goal ratio to have a value of 0.5 (i.e., 500/1,000).

Similarly, the normalization module 250 may compute an achievement ratio to be a ratio of the progress made by the online system 140 towards achieving one goal associated with a set of content items to progress made by the online system 140 towards achieving another goal associated with the set of content items. In the above example, the normalization module 250 may access the achievement store 245 to retrieve information describing progress made by the online system 140 towards achieving the reach goal and the impression goal. In this example, if a reach count associated with the reach goal indicates that the set of content items has been presented to 200 different online system users and an impression count associated with the impression goal indicates that the content items have achieved 600 impressions, the normalization module 250 may compute the achievement ratio to have a value of 0.33 (i.e., 200/600).

In alternative embodiments, the normalization module 250 may compute a normalized ratio in a different manner. In embodiments in which the online system 140 guarantees achievement of one or more types of goals that are different from those just described, the normalization module 250 may compute the normalized ratio based on the types of goals and on the progress made by the online system towards achieving the corresponding types of goals. For example, if a set of content items is associated with a click goal and a conversion goal, the normalization module 250 may compute a goal ratio to be a ratio of the conversion goal to the click goal and an achievement ratio to be a ratio of achieved conversions to achieved clicks. In this example, the normalization module 250 may then compute the normalized ratio to be a ratio of the achievement ratio to the goal ratio. In some embodiments, at least some of the ratios may be expressed as inverses of the ratios described in the above examples. For example, the normalization module 250 may compute the normalized ratio to be a ratio of the goal ratio to the achievement ratio. As an additional example, the normalization module 250 may compute the achievement ratio to be a ratio of the achieved impressions to the achieved reach and the goal ratio to be a ratio of the impression goal to the reach goal. The functionality of the normalization module 250 is further described below in conjunction with FIG. 3.

In some embodiments, once the normalization module 250 has computed one or more normalized ratios, the graphing module 255 may plot (e.g., as shown in step 328 of FIG. 3) each normalized ratio as a function of time on a graph. For example, if the normalization module 250 computes a normalized ratio at a particular time, the graphing module 255 may plot a point on a two-dimensional graph, in which the point has a y-coordinate corresponding to the normalized ratio and an x-coordinate corresponding to the time at which the normalized ratio was computed. In this example, the graphing module 255 also may plot a point corresponding to each normalized ratio subsequently computed by the normalization module 250 on the same graph. In some embodiments, once the graphing module 255 has plotted multiple points on a graph corresponding to multiple normalized ratios as a function of time, the graphing module 255 also may generate a "trend line" that best fits the points. For example, the graphing module 255 may generate a trend line that best fits multiple points plotted on a graph that correspond to multiple normalized ratios, such that the trend line shows a general direction in which the normalized ratio seems to be heading over time.

In embodiments in which a set of content items is associated with multiple goals, in addition to plotting one or more points corresponding to normalized ratios as a function of time on a graph, the graphing module 255 also may generate (e.g., as shown in step 330 of FIG. 3) one or more curves on the same graph corresponding to threshold values associated with the goals. Curves generated by the graphing module 255 may include one or more over-delivery curves that correspond to a trend of normalized ratios that may result in achievement of one goal associated with a set of content items, but not another goal associated with the set of content items within a period of time in which the goals are to be achieved. For example, if a set of content items is associated with an impression goal and a reach goal, the graphing module 255 may generate a reach over-delivery curve that corresponds to a trend of normalized ratios that may result in achievement of the reach goal, but not the impression goal within a period of time in which the goals are to be achieved. In this example, the graphing module 255 also may generate an impression over-delivery curve that corresponds to a trend of normalized ratios that may result in achievement of the impression goal, but not the reach goal within the period of time in which the goals are to be achieved. In embodiments in which the set of content items are associated with other types of goals, the curves generated by the graphing module 255 also may include other types of over-delivery curves corresponding to threshold values associated with the types of goals (e.g., a conversion over-delivery curve, a click over-delivery curve, etc.).

In some embodiments, the curves generated by the graphing module 255 also may include a target curve and a tolerance threshold curve. A target curve may correspond to a trend of normalized ratios that may result in achievement of multiple goals associated with a set of content items within a period of time in which the goals are to be achieved. For example, if a set of content items is associated with a reach goal and an impression goal, the graphing module 255 may generate a target curve that corresponds to a trend of normalized ratios that may result in achievement of both goals within a period of time in which the goals are to be achieved. In various embodiments, the over-delivery curves (e.g., the reach over-delivery curve and the impression over-delivery curve) and the target curve intersect at a point corresponding to the end of the period of time in which the goals are to be achieved. For example, suppose that a set of content items is associated with an impression goal and a reach goal that are to be achieved within a specified month. In this example, if the graphing module 255 generates curves on a two-dimensional graph, in which the y-axis represents normalized ratios and the x-axis represents time, the curves generated by the graphing module 255 may include a reach over-delivery curve, an impression over-delivery curve, and a target curve that intersect at a point having an x-coordinate corresponding to the end of the specified month. In embodiments in which the graphing module 255 generates a tolerance threshold curve, points along the tolerance threshold curve correspond to a trend of normalized ratios that may result in an over-achievement of a goal that is tolerated. For example, if a set of content items is associated with a reach goal and an impression goal, since it is often more difficult to achieve reach goals than impression goals, the graphing module 255 may generate a tolerance threshold curve that may indicate that achievement of a greater reach than is required by the reach goal will be tolerated to ensure that the reach goal is achieved.

In embodiments in which the graphing module 255 generates one or more curves corresponding to threshold values associated with goals associated with a set of content items, the graphing module 255 may generate the curves based on various types of information. For example, in a two-dimensional graph, in which the x-axis represents time and the y-axis represents normalized ratios, the graphing module 255 may designate a point having the coordinates (1, 1) to correspond to the end of a period of time associated with a reach goal and an impression goal associated with a set of content items at which both goals have been achieved (i.e., a normalized ratio of 1 at time t=1). In this example, since a target curve generated by the graphing module 255 will have a normalized ratio of 1 at all times during the period of time associated with the goals, the target curve will correspond to a straight line having an equation of y=1.

In some embodiments, the graphing module 255 may generate one or more curves included in a graph based on historical data maintained in the online system 140 (e.g., historical impression data and/or historical reach data). For example, if the graphing module 255 has generated a target curve corresponding to a straight line having an equation of y=1, the graphing module 255 also may generate lines corresponding to a reach over-delivery curve and an impression over-delivery curve that intersect the target curve at the point having the coordinates (1,1) corresponding to the end of the period of time at which the goals are to be achieved. In this example, the graphing module 255 may determine a y-intercept and/or a slope of the impression over-delivery curve and the reach over-delivery curve based on historical impression and reach data for various content items having at least a threshold measure of similarity to the set of content items during time intervals that are the same as or similar to the period of time associated with the goals. In the above example, the online system 140 also may predict a threshold normalized ratio at which a likelihood that the reach goal will be achieved by the end of the period of time associated with the goals is at least a threshold likelihood (e.g., based on the historical reach data). In this example, if the online system 140 predicts the threshold normalized ratio to be 1.1, the graphing module 255 may generate a tolerance threshold curve that is a straight line having an equation of y=1.1. In some embodiments, the graphing module 255 also may generate one or more of the curves using a machine-learning model. In the above examples, the online system 140 may train a machine-learning model using the historical impression and reach data. In these examples, the graphing module 255 subsequently may generate one or more of the curves using the model. The functionality of the graphing module 255 is further described below in conjunction with FIGS. 3 and 4A-4D.

The filter initialization module 260 may identify (e.g., as shown in step 306 of FIG. 3) one or more types of filters to be associated with a set of content items that is associated with one or more goals. In some embodiments, for each type of goal associated with a set of content items, the filter initialization module 260 may identify a corresponding type of filter to be associated with the set of content items. For example, if a set of content items is associated with an impression goal and a reach goal, the filter initialization module 260 may identify an impression filter and a reach filter to be associated with the set of content items.

The filter initialization module 260 also may set (e.g., as shown in step 308 of FIG. 3) the values of one or more filters associated with a set of content items. Values of filters associated with a set of content items may be set by the filter initialization module 260 at the beginning of one or more time intervals within a period of time in which one or more goals associated with the set of content items are to be achieved. For example, if a reach goal and an impression goal associated with a set of content items are to be achieved by the end of a specified week, the filter initialization module 260 may set values of an impression filter and a reach filter associated with the set of content items at the beginning of the week or at the beginning of each day within the week. In some embodiments, the filter initialization module 260 may set the values of filters to base values. For example, if values of impression and reach filters associated with a set of content items correspond to probabilities, the filter initialization module 260 may set the values of both filters to a base value of 1 at the beginning of a period of time in which an impression goal and a reach goal associated with the content items are to be achieved.

In alternative embodiments, the filter initialization module 260 may determine the values of one or more filters associated with a set of content items and set the values accordingly. For example, if a large number of impressions of a set of content items and/or a large number of unique online system users are to be presented with the content items within a short period of time, the filter initialization module 260 may determine higher values of a reach filter and/or an impression filter associated with the set of content items than if a smaller number of impressions and/or a smaller number of unique online system users were to be presented with the set of content items within a longer period of time. As an additional example, the filter initialization module 260 may set the values of an impression filter and a reach filter associated with a set of content items at the beginning of a period of time in which impression and reach goals associated with the content items are to be achieved based on historical impression and reach frequencies for content items associated with similar targeting criteria and bid amounts during time periods of similar length to the period of time associated with the goals. The functionality of the filter initialization module 260 is further described below in conjunction with FIG. 3.

Each time the normalization module 250 computes a normalized ratio, the filter evaluation module 265 may compare (e.g., as shown in step 332 of FIG. 3) one or more points on a graph corresponding to normalized ratios computed by the normalization module 250 to one or more curves corresponding to threshold values associated with the goals. Based on the comparison, the filter evaluation module 265 determines (e.g., as shown in step 334 of FIG. 3) whether the values of one or more filters associated with a set of content items need to be adjusted in order to achieve the goals associated with the content items within the period of time guaranteed by the online system 140. In some embodiments, if a point on the graph corresponding to a current normalized ratio is on one side of different over-delivery curves, the filter evaluation module 265 may determine that the values of one or more filters should be adjusted. For example, if a set of content items is associated with an impression goal and a reach goal and a point on a graph corresponding to a current normalized ratio is on one side of an impression over-delivery curve and a reach over-delivery curve, the filter evaluation module 265 may determine that the value of a reach filter and/or an impression filter associated with the set of content items should be adjusted.

In embodiments in which the filter evaluation module 265 compares one or more points on a graph corresponding to normalized ratios computed by the normalization module 250 to one or more curves, if a point on the graph corresponding to a current normalized ratio is between an over-delivery curve and a target curve, the filter evaluation module 265 may determine whether the current normalized ratio is improving (i.e., approaching the target curve) or deteriorating (i.e., deviating from the target curve). The filter evaluation module 265 may do so by comparing the point to a point corresponding to an additional normalized ratio that previously was computed for the set of content items. For example, suppose that at time t=0.2, the normalized ratio is computed to be 1.1, such that a point on a graph corresponding to this first normalized ratio has the coordinates (0.2, 1.1) and that subsequently, at time t=0.25, the normalized ratio is computed to be 1.3, such that a point on the graph corresponding to this second normalized ratio has the coordinates (0.25, 1.3). In this example, if the filter evaluation module 265 determines that the point corresponding to the second normalized ratio is between a target curve having an equation of y=1 and a reach over-delivery curve, the filter evaluation module 265 may then determine that the normalized ratio is deteriorating by comparing the coordinates of this point to the coordinates of the point corresponding to the first normalized ratio and to the target curve. As an additional example, suppose that at time t=0.1, the normalized ratio is computed to be 1.4, such that a point on a graph corresponding to this first normalized ratio has the coordinates (0.1, 1.4) and that subsequently, at time t=0.15, the normalized ratio is computed to be 1.3, such that a point on the graph corresponding to this second normalized ratio has the coordinates (0.15, 1.3). In this example, if the filter evaluation module 265 determines that the point corresponding to the second normalized ratio is between a target curve having an equation of y=1 and a reach over-delivery curve, the filter evaluation module 265 may then determine that the normalized ratio is improving by comparing the coordinates of this point to the coordinates of the point corresponding to the first normalized ratio and to the target curve.

The filter evaluation module 265 may determine whether the value of a filter associated with a set of content items needs to be adjusted based at least in part on whether the normalized ratio is improving or deteriorating. In embodiments in which the filter evaluation module 265 has determined that the normalized ratio is deteriorating, the filter evaluation module 265 may determine that the value of a filter associated with a set of content items needs to be adjusted. In embodiments in which the filter evaluation module 265 has determined that the normalized ratio is improving, the filter evaluation module 265 may determine whether the value of a filter associated with a set of content items needs to be adjusted based at least in part on a trend of points corresponding to normalized ratios computed by the normalization module 250. For example, the graphing module 255 may plot multiple points corresponding to the current normalized ratio and normalized ratios previously computed by the online system 140 and generate a "trend line" that best fits the points. In this example, if the trend line intersects the target curve at a point along the trend line corresponding to the end of a period of time in which an impression goal and a reach goal are to be achieved, the filter evaluation module 265 may determine that the values of the corresponding filters do not need to be adjusted.

In some embodiments, the filter evaluation module 265 also may determine whether the value of a filter associated with a set of content items needs to be adjusted based at least in part on a tolerance threshold curve. In the above example, if a tolerance threshold allows for slight over-achievement of the reach goal and the trend line intersects a region bounded by a tolerance threshold curve corresponding to the tolerance threshold and the target curve at the point along the trend line corresponding to the end of the period of time associated with the goals, the filter evaluation module 265 also may determine that the values of the filters do not need to be adjusted. In the above examples, if the trend line does not intersect the target curve or does not intersect the region bounded by the tolerance threshold curve and the target curve at the point along the trend line corresponding to the end of the period of time associated with the goals, the filter evaluation module 265 may determine that the value of a filter associated with a set of content items needs to be adjusted.

Once the filter evaluation module 265 has determined that the values of one or more filters associated with a set of content items need to be adjusted, the filter evaluation module 265 may identify (e.g., as shown in step 336 of FIG. 3) one or more filters having values that need to be adjusted. In embodiments in which the filter evaluation module 265 has determined that the normalized ratio is deteriorating, the filter evaluation module 265 may identify a filter having a value that needs to be adjusted by comparing a distance between a point corresponding to the current normalized ratio and a point corresponding to each of the over-delivery curves. For example, if a normalized ratio is deteriorating and a point on a graph corresponding to the current normalized ratio is closer to a point along a reach over-delivery curve corresponding to a current time than to a point along an impression over-delivery curve corresponding to the current time, the filter evaluation module 265 may identify a reach filter associated with a set of content items as the filter having the value that needs to be adjusted. Alternatively, in the above example, if the point on the graph is closer to the point along the impression over-delivery curve corresponding to the current time than to the point along the reach over-delivery curve corresponding to the current time, the filter evaluation module 265 may identify an impression filter associated with the set of content items as the filter having the value that needs to be adjusted.

Similarly, in embodiments in which the filter evaluation module 265 determines that the normalized ratio is improving, but that the value of a filter associated with the set of content items needs to be adjusted, the filter evaluation module 265 may identify the filter that needs to be adjusted by comparing a distance between a point corresponding to the current normalized ratio and a point along each of the over-delivery curves. For example, if a normalized ratio is improving and a point on a graph corresponding to the current normalized ratio is closer to a point along a reach over-delivery curve corresponding to a current time than to a point along an impression over-delivery curve corresponding to the current time, the filter evaluation module 265 may identify a reach filter associated with a set of content items as the filter having the value that needs to be adjusted. Alternatively, in the above example, if the point on the graph is closer to the point along the impression over-delivery curve than to the point along the reach over-delivery curve, the filter evaluation module 265 may identify an impression filter associated with the set of content items as the filter having the value that needs to be adjusted. The functionality of the filter evaluation module 265 is further described below in conjunction with FIGS. 3 and 4A-4D.

The filter adjustment module 270 may determine (e.g., as shown in step 338 of FIG. 3) an amount by which to adjust the values of one or more filters associated with a set of content items and adjust (e.g., as shown in step 340 of FIG. 3) the values accordingly. The filter adjustment module 270 may adjust the value of a filter associated with a set of content items to a value that would increase the likelihood that a normalized ratio that subsequently is computed by the normalization module 250 will approach the target curve, hence also increasing the likelihood that goals associated with the set of content items will be achieved within a period of time guaranteed by the online system 140.

In embodiments in which the filter evaluation module 265 has determined that a point on a graph corresponding to a current normalized ratio is on one side of different over-delivery curves, the filter adjustment module 270 may determine that the values of one or more filters should be adjusted to one or more base values and adjust the values accordingly. For example, suppose that a set of content items is associated with an impression goal and a reach goal and that a point on a graph corresponding to a current normalized ratio is on one side of an impression over-delivery curve and a reach over-delivery curve and is closer to the reach over-delivery curve than to the impression over-delivery curve. In this example, if values of filters correspond to probabilities, the filter adjustment module 270 may determine that the value of a reach filter associated with the set of content items should be adjusted to a base value of 0 and that the value of an impression filter associated with the set of content items should be adjusted to a base value of 1. Conversely, suppose that a point on a graph corresponding to a current normalized ratio is on one side of an impression over-delivery curve and a reach over-delivery curve and is closer to the impression over-delivery curve than to the reach over-delivery curve. In this example, if values of filters also correspond to probabilities, the filter adjustment module 270 may determine that the value of a reach filter associated with a set of content items should be adjusted to a base value of 1 and that the value of an impression filter associated with the set of content items should be adjusted to a base value of 0.

In embodiments in which the filter evaluation module 265 has determined that the normalized ratio is deteriorating, once the filter evaluation module 265 has identified a filter having a value that needs to be adjusted, the filter adjustment module 270 may determine the amount by which to adjust the value of the filter. The filter adjustment module 270 may do so based at least in part on a difference between the current normalized ratio and a threshold value corresponding to an over-delivery curve. For example, suppose that a point on a graph corresponding to a first normalized ratio has the coordinates (0.2, 1.1), a point on the graph corresponding to a second normalized ratio, which is the current normalized ratio, has the coordinates (0.25, 1.3), and the current value of a reach filter is 0.6. Suppose also that the filter evaluation module 265 has determined that the point corresponding to the second normalized ratio is between a target curve having an equation of y=1 and a reach over-delivery curve, that the normalized ratio is deteriorating, and that the value of a reach filter associated with a set of content items needs to be adjusted. In this example, the filter adjustment module 270 may determine coordinates at which a vertical line passing through the point corresponding to the second normalized ratio would intersect the reach over-delivery curve and the target curve (e.g., (0.25, 2.5) and (0.25, 1), respectively). In this example, the filter adjustment module 270 may then compute a weight based on the coordinates (e.g., weight=1−((y-coordinate of point−y-coordinate of reach over-delivery curve)/(y-coordinate of target curve−y-coordinate of reach over-delivery curve))=1−((1.3−2.5)/(1−2.5))=0.2). The filter adjustment module 270 may then adjust the current value of the reach filter (i.e., 0.6) to a new value based on the weight (e.g., new reach filter=minimum reach filter+weight*(current reach filter−minimum reach filter)=0+0.2*(0.6−0)=0.12. In the above example, if the filter adjustment module 270 had determined that the value of an impression filter or any other type of filter associated with the set of content items needed to be adjusted, the filter adjustment module 270 may adjust the value of the filter in an analogous manner.

In embodiments in which the filter evaluation module 265 determines that the normalized ratio is improving, but that the value of a filter associated with a set of content items needs to be adjusted and has identified the filter having the value to be adjusted, the filter adjustment module 270 may then determine an amount by which to adjust the value of the filter. The filter adjustment module 270 may determine an amount by which to adjust the value of a filter based at least in part on a complement of the current value of the filter. For example, if the filter evaluation module 265 has determined that the value of a reach filter associated with a set of content items needs to be adjusted from its current value of 0.3, the filter adjustment module 270 may determine a complement of the current value of the reach filter (i.e., 1−0.3=0.7). In this example, the filter adjustment module 270 may add a fraction of the complement to the current value of the reach filter to obtain the new value of the reach filter. Continuing with this example, if the fraction of the complement is 10% (i.e., 0.1), the new value of the reach filter may be computed to be the following: new reach filter=current reach filter+((1−current reach filter)*fraction)=0.3+(0.7*0.1)=0.37. In the above example, the fraction of the complement may be set to a default value or may be determined by a machine-learning model. Furthermore, in the above example, if the filter evaluation module 265 had determined that the value of an impression filter or any other type of filter associated with the set of content items needed to be adjusted, the filter adjustment module 270 may adjust the value of the filter in an analogous manner.

In some embodiments, once a goal associated with a set of content items is achieved, the filter adjustment module 270 may adjust the value of a filter corresponding to the goal to a minimum value, such that the number of impression opportunities for which the online system 140 will consider presenting one or more content items included among the set of content items to a viewing user of the online system 140 may be minimized. For example, suppose that a set of content items is associated with an impression goal and a reach goal and that values of filters associated with the set of content items correspond to probabilities. In this example, once the impression goal is achieved, the filter adjustment module 270 may adjust the value of an impression filter associated with the set of content items to 0. In the above example, once the reach goal is achieved, the filter adjustment module 270 also may adjust the value of a reach filter associated with the set of content items to 0. Alternatively, in embodiments in which a tolerance threshold curve allows for slight over-achievement of a goal, a filter corresponding to the goal may remain the same or may be adjusted by a different amount (e.g., to a value between the current value and 0) once the goal is achieved. The functionality of the filter adjustment module 270 is further described below in conjunction with FIGS. 3 and 4A-4D.

The content selection module 275 selects (e.g., as shown in step 312 of FIG. 3) one or more content items for presentation to online system users. The content selection module 275 may identify content items eligible for presentation to a viewing user of the online system 140 based at least in part on one or more filters associated with the content items. For example, in embodiments in which values of filters correspond to probabilities, suppose that the value of an impression filter associated with a set of content items corresponds to a probability of 10% (i.e., 0.1) and that a value of a reach filter associated with the set of content items corresponds to a probability of 80% (i.e., 0.8). In this example, upon identifying an opportunity to present content to a viewing user of the online system 140, the content selection module 275 may determine whether any of these content items previously were presented to the viewing user (e.g., based on information received by the action logger 215 describing previous presentations of content items to online system users). Continuing with this example, if any of the content items previously were presented to the viewing user, the content selection module 275 may identify one or more content items included among the set of content items as candidate content items eligible for presentation to the viewing user based on the impression filter associated with the content items, such that there is a 10% probability that the content selection module 275 may identify any of the content items as candidate content items. Alternatively, in the above example, if none of the content items previously were presented to the viewing user, the content selection module 275 may identify one or more of the content items included among the set of content items as candidate content items eligible for presentation to the viewing user based on the reach filter associated with the content items, such that there is an 80% probability that the content selection module 275 may identify any of the content items as candidate content items.

In some embodiments, the content selection module 275 also may take into account additional factors when identifying content items eligible for presentation to viewing users of the online system 140 (e.g., targeting criteria). For example, once the content selection module 275 has identified content items that are associated with targeting criteria satisfied by a viewing user of the online system 140, the content selection module 275 may then identify one or more of these content items as candidate content items that are eligible for presentation to the viewing user based on one or more filters associated with these content items.

In some embodiments, the content selection module 275 may rank candidate content items based at least in part on a value associated with each candidate content item and select one or more content items having the highest values for presentation to the viewing user. For example, the content selection module 275 may rank a set of candidate content items based at least in part on a bid amount associated with each candidate content item. In this example, the content selection module 275 may then select one or more of the candidate content items for presentation to the user based at least in part on the ranking. In some embodiments, a value associated with a candidate content item may correspond to a score computed by the content selection module 275 that indicates a predicted affinity of an online system user for the candidate content item. In the above example, the content selection module 275 may compute an affinity score for each candidate content item that indicates a predicted affinity of the user for the candidate content item. Continuing with this example, the content selection module 275 may then rank the candidate content items based at least in part on the bid amount and/or on the affinity score associated with each candidate content item and select one or more of the candidate content items for presentation to the user based at least in part on the ranking. The functionality of the content selection module 275 is further described below in conjunction with FIG. 3.

The user interface module 280 generates (e.g., as shown in step 314 of FIG. 3) a user interface in which one or more content items selected for presentation to a user of the online system 140 are presented. The user interface may include a feed of content items. For example, the user interface may include a newsfeed that includes one or more advertisements. The user interface also may include a set of interactive elements (e.g., buttons) that each correspond to an option associated with a content item that may be selected by a user. Examples of options include an option to express a preference for a content item, an option to share the content item with additional online system users, and an option to comment on the content item. For example, if an online system user presented with a content item clicks on a button corresponding to an option to express a preference for the content item, other online system users to whom the user is connected may receive a notification that the user has expressed a preference for the content item. The functionality of the user interface module 280 is further described below in conjunction with FIG. 3.

The web server 285 links the online system 140 via the network 120 to the one or more client devices 110, as well as to the third-party system 130 and/or one or more third-party systems 130. The web server 285 serves web pages, as well as other content, such as JAVA®, FLASH®, XML and so forth. The web server 285 may receive and route messages between the online system 140 and the client device 110, for example, instant messages, queued messages (e.g., email), text messages, short message service (SMS) messages, or messages sent using any other suitable messaging technique. A user may send a request to the web server 285 to upload information (e.g., images or videos) that are stored in the content store 210. Additionally, the web server 285 may provide application programming interface (API) functionality to send data directly to native client device operating systems, such as IOS®, ANDROID™, WEBOS® or BlackberryOS.

Figure 3:
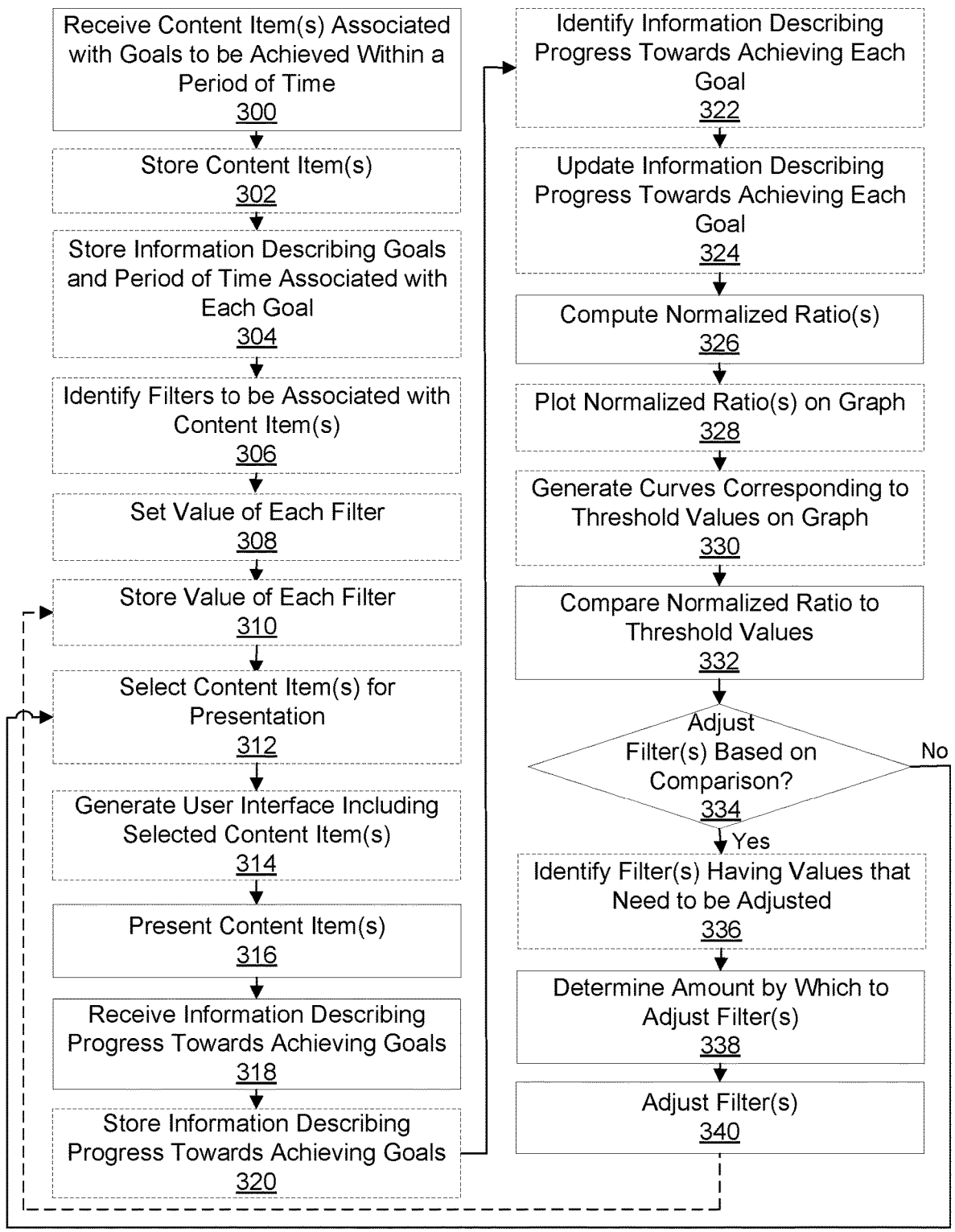
FIG. 3 is a flow chart of a method for managing impression opportunities for a set of content items associated with goals to guarantee achievement of the goals within a specified period of time, in accordance with an embodiment.

Managing Impression Opportunities for a Set of Content Items Associated with Goals to Guarantee Achievement of the Goals within a Specified Period of Time FIG. 3 is a flow chart of a method for managing impression opportunities for a set of content items associated with goals to guarantee achievement of the goals within a specified period of time. In other embodiments, the method may include different and/or additional steps than those shown in FIG. 3. Additionally, steps of the method may be performed in a different order than the order described in conjunction with FIG. 3.

The online system 140 may receive 300 a set of content items from a content-providing user of the online system 140, in which the set of content items is associated with an impression goal and a reach goal that are associated with a specified period of time in which the online system 140 has guaranteed that the goals will be achieved. For example, if a set of content items received 300 from a content-providing user of the online system 140 is associated with an impression goal of 500 impressions, the online system 140 may guarantee that the set of content items will be presented to one or more users of the online system 140 at least 500 times within a specified week. In this example, if the set of content items also is associated with a reach goal of 300 online system users, the online system 140 may guarantee that the set of content items will be presented to at least 300 different users of the online system 140 within the specified week.

In addition to an impression goal and a reach goal, in some embodiments, the set of content items also may be associated with other types of goals, such as a conversion goal, a click goal, or any other suitable type of goal that may be achieved by the set of content items. For example, if a set of content items is associated with a conversion goal, the online system 140 may guarantee that a given number of purchases will be made by online system users in association with presentations of the set of content items within a specified period of time. As an additional example, if a set of content items is associated with a click goal, the online system 140 may guarantee that a given number of clicks on the set of content items will be achieved within a specified period of time. As yet another example, if a set of content items is associated with a "like" goal, the online system 140 may guarantee that a given number of online system users will have expressed a preference for the set of content items within a specified period of time.

In some embodiments, once the online system 140 has received 300 the set of content items, the online system 140 may store 302 the content items (e.g., in the content store 210). The online system 140 may store 302 each of the content items received 300 from the content-providing user in association with information that may be used to uniquely identify the content item. For example, the online system 140 may store 302 an object representing each content item received 300 from a content-providing user of the online system 140 in the content store 210 in association with information identifying the content-providing user and a title or other unique identifier assigned to the content item by the content-providing user. As an additional example, in embodiments in which the online system 140 assigns a unique identifier to each content item maintained in the online system 140, the online system 140 may store 302 each content item received 300 from the content-providing user in the content store 210 in association with a unique identification number assigned to the content item by the online system 140.

Once the online system 140 has received 300 the set of content items, the online system 140 also may store 304 information describing the goals associated with the set of content items and a period of time associated with each goal (e.g., in the content store 210 and/or in the goal store 230). In embodiments in which the set of content items received 300 by the online system 140 includes multiple content items, information describing each goal associated with the set of content items may be stored 304 in the online system 140 in association with information describing a period of time associated with the goal and information identifying each content item associated with the goal. For example, suppose that a set of content items is associated with an impression goal and a reach goal. In this example, the online system 140 may store 304 information describing the impression goal in the goal store 230 in association with information describing a period of time in which the impression goal is to be achieved and information identifying each content item included among the set of content items. Similarly, in this example, the online system 140 also may store 304 information describing the reach goal in the goal store 230 in association with information describing a period of time in which the reach goal is to be achieved and information identifying each content item included among the set of content items.

In some embodiments, the online system 140 may identify 306 (e.g., using the filter initialization module 260) an impression filter and a reach filter to be associated with the set of content items. For each type of goal associated with the set of content items, the online system 140 may identify 306 a corresponding type of filter to be associated with the set of content items. For example, if the set of content items is associated with an impression goal and a reach goal, the online system 140 may identify 306 an impression filter and a reach filter to be associated with the set of content items. As an additional example, if the set of content items is associated with a click goal and a conversion goal, the online system 140 may identify 306 a click filter and a conversion filter to be associated with the set of content items.

In some embodiments, the online system 140 may set 308 (e.g., using the filter initialization module 260) the values of one or more filters associated with the set of content items. The value of each filter may control a number of impression opportunities for which one or more content items included among the set of content items associated with the filter will be eligible for presentation to users of the online system 140. In some embodiments, values of filters may correspond to probabilities. For example, suppose that the value of an impression filter associated with a set of content items corresponds to a probability of 10% (i.e., 0.1). In this example, upon identifying an opportunity to present content to a viewing user of the online system 140, there is a 10% probability that the online system 140 will identify one or more content items included among the set of content items as being eligible for presentation to the viewing user.

The online system 140 may set 308 the values of the filters associated with the set of content items at the beginning of one or more time intervals within the period of time in which the goals associated with the set of content items are to be achieved. For example, if a reach goal and an impression goal associated with a set of content items are to be achieved by the end of a specified week, the online system 140 may set 308 the values of an impression filter and a reach filter associated with the set of content items at the beginning of the week or at the beginning of each day within the week. In some embodiments, the online system 140 may set 308 the values of the filters to base values. For example, if values of impression and reach filters associated with a set of content items correspond to probabilities, the online system 140 may set 308 the values of both filters to a base value of 1 at the beginning of a period of time in which an impression goal and a reach goal associated with the content items are to be achieved.

In alternative embodiments, the online system 140 may determine the values of the filters and set 308 the values accordingly. For example, if a large number of impressions of a set of content items and/or a large number of unique online system users are to be presented with the set of content items within a short period of time, the online system 140 may determine higher values of a reach filter and/or an impression filter associated with the set of content items than if a smaller number of impressions and/or a smaller number of unique online system users were to be presented with the set of content items within a longer period of time. As an additional example, the online system 140 may set 308 the values of the impression filter and the reach filter associated with the set of content items at the beginning of the period of time in which impression and reach goals associated with the content items are to be achieved based on historical impression and reach frequencies for content items associated with similar targeting criteria and bid amounts during time periods of similar length to the period of time associated with the goals.

In various embodiments, once the online system 140 has set 308 the value of each filter associated with the set of content items, the online system 140 may store 310 the values (e.g., in the filter store 235). In some embodiments, for each goal associated with the set of content items, a value of a corresponding filter may be stored 310 in the online system 140. For example, if the set of content items is associated with an impression goal, each content item included among the set of content items may be associated with an impression filter. In this example, a value of the impression filter may be stored 310 in the filter store 235. In the above example, if the set of content items also is associated with a reach goal, each content item included among the set of content items also may be associated with a reach filter. In this example, a value of the reach filter also may be stored 310 in the filter store 235.

The value of each filter associated with the set of content items may be stored 310 in association with information identifying the content items, information describing a corresponding goal associated with the content items, and information describing the period of time associated with the goal. For example, a value of an impression filter associated with a set of content items may be stored 310 in the filter store 235 in association with information identifying each content item included among the set of content items, information describing a number of impressions that must be achieved by the set of content items based on an impression goal associated with the set of content items, and a period of time in which the online system 140 has guaranteed that the impression goal will be achieved.

The online system 140 may select 312 (e.g., using the content selection module 275) the set of content items for presentation to viewing users of the online system 140. To select 312 the content items, the online system 140 may identify content items eligible for presentation to each viewing user of the online system 140 based at least in part on one or more filters associated with the content items. For example, in embodiments in which values of filters correspond to probabilities, suppose that the value of an impression filter associated with a set of content items corresponds to a probability of 10% (i.e., 0.1) and that a value of a reach filter associated with the set of content items corresponds to a probability of 80% (i.e., 0.8). In this example, upon identifying an opportunity to present content to a viewing user of the online system 140, the online system 140 may determine whether any of these content items previously were presented to the viewing user (e.g., based on information received by the online system 140 describing previous presentations of content items to online system users, as described below). Continuing with this example, if any of the content items previously were presented to the viewing user, the online system 140 may identify one or more content items included among the set of content items as candidate content items eligible for presentation to the viewing user based on the impression filter associated with the content items, such that there is a 10% probability that the online system 140 may identify any of the content items as candidate content items. Alternatively, in the above example, if none of the content items previously were presented to the viewing user, the online system 140 may identify one or more of the content items included among the set of content items as candidate content items eligible for presentation to the viewing user based on the reach filter associated with the content items, such that there is an 80% probability that the online system 140 may identify any of the content items as candidate content items.

In some embodiments, the online system 140 also may take into account additional factors when identifying content items eligible for presentation to viewing users of the online system 140 (e.g., targeting criteria). For example, once the online system 140 has identified content items that are associated with targeting criteria satisfied by a viewing user of the online system 140, the online system 140 may then identify one or more of these content items as candidate content items that are eligible for presentation to the viewing user based on one or more filters associated with these content items.

In some embodiments, the online system 140 may rank candidate content items based at least in part on a value associated with each candidate content item and select 312 one or more content items having the highest values for presentation to the viewing user. For example, the online system 140 may rank a set of candidate content items based at least in part on a bid amount associated with each candidate content item. In this example, the online system 140 may then select 312 one or more of the candidate content items for presentation to the user based at least in part on the ranking. In some embodiments, a value associated with a candidate content item may correspond to a score computed by the online system 140 that indicates a predicted affinity of an online system user for the candidate content item. In the above example, the online system 140 may compute an affinity score for each candidate content item that indicates a predicted affinity of the user for the candidate content item. Continuing with this example, the online system 140 may then rank the candidate content items based at least in part on the bid amount and/or on the affinity score associated with each candidate content item and select 312 one or more of the candidate content items for presentation to the user based at least in part on the ranking.

The online system 140 may generate 314 (e.g., using the user interface module 280) a user interface in which to present the content items selected 312 for presentation to each viewing user of the online system 140. In some embodiments, the user interface generated 314 by the online system 140 may include a feed of content items in which one or more content items selected 312 by the online system 140 may be presented. For example, the online system 140 may generate 314 a newsfeed associated with a user profile of an online system user, in which the newsfeed includes multiple content items, such as advertisements, videos, images, text, etc. The user interface also may include a set of interactive elements (e.g., buttons) that each correspond to an option associated with a content item that may be selected by a user. Examples of options include an option to express a preference for a content item, an option to share the content item with additional online system users, and an option to comment on the content item. For example, if an online system user presented with a content item clicks on a button corresponding to an option to express a preference for the content item, other online system users to whom the user is connected may receive a notification that the user has expressed a preference for the content item.

The online system 140 may present 316 the set of content items to viewing users of the online system 140. For example, upon identifying an opportunity to present content to a viewing user of the online system 140, the online system 140 may send one or more of the set of content items to a client device 110 associated with the viewing user. In this example, once the content items are received at the client device 110, the content items may be presented 316 to the viewing user in a display area of the client device 110. As an additional example, if the online system 140 generates 314 a user interface that includes one or more content items selected 312 for presentation to a viewing user of the online system 140, the online system 140 may send the user interface for display to the user. In this example, the online system 140 may send the user interface for display to the user in a display area of a client device 110 associated with the user.

The online system 140 may receive 318 (e.g., using the action logger 215) information describing the progress made by the online system 140 towards achieving the goals associated with the set of content items. Information describing the progress made by the online system 140 towards achieving the goals associated with the set of content items may describe events associated with the content items that also are associated with the goals. Examples of information describing the progress made by the online system 140 towards achieving one or more goals associated with a content item may include user-identifying information for a viewing user of the online system 140 to whom the content item was presented 316 or who performed an action associated with the content item (e.g., an IP address associated with the user, a username or a user ID associated with the user, etc.), information identifying the content item, information describing one or more goals associated with the content item, and information indicating a date and a time at which the content item was presented 316 or a date and a time at which the user performed the action associated with the content item (e.g., in a timestamp). For example, upon presenting 316 an advertisement associated with an impression goal to a viewing user of the online system 140, the online system 140 may receive 318 an IP address associated with the viewing user, information identifying an advertising campaign associated with the advertisement, information indicating that the advertisement is associated with the impression goal, and a date and a time at which the advertisement was presented 316.

The online system 140 may store 320 (e.g., using the action logger 215) information describing the progress made by the online system 140 towards achieving the goals associated with the set of content items (e.g., in the action log 220). For example, upon receiving 318 information describing the progress made by the online system 140 towards achieving an impression goal associated with a set of content items, the online system 140 may store 320 the information as a record in a table in the action log 220.

In some embodiments, the online system 140 may identify 322 (e.g., using the achievement module 240) information received 318 by the online system 140 describing progress made by the online system 140 towards achieving each goal associated with the set of content items within the period of time associated with the goal. For example, suppose that a set of content items is associated with an impression goal and that the online system 140 receives 318 information describing an impression achieved by a content item included among the set of content items for a viewing user of the online system 140. In this example, based on information identifying the content item included among the information received 318 by the online system 140, the online system 140 may access the goal store 230 or the content store 210 and retrieve information describing the impression goal and a period of time in which the impression goal is to be achieved. Continuing with this example, if the information describing the impression achieved by the content item was received 318 by the online system 140 at a time within the period of time in which the impression goal is to be achieved, the online system 140 may identify 322 the information received 318 by the online system 140 as information describing progress made by the online system 140 towards achieving the impression goal.

In the above example, if the set of content items also is associated with a reach goal, the online system 140 also may retrieve information describing the reach goal and a period of time in which the reach goal is to be achieved from the goal store 230 or the content store 210. Continuing with this example, if the information describing the impression achieved by the content item was received 318 by the online system 140 at a time within the period of time in which the reach goal is to be achieved, the online system 140 also may access the action log 220 and determine whether any content items included among the set of content items previously were presented 316 to the viewing user within the period of time (e.g., based on user-identifying information associated with the viewing user included among the information received 318 by the online system 140). In this example, if none of the set of content items previously were presented 316 to the viewing user within the period of time in which the reach goal is to be achieved, the online system 140 also may identify 322 the information it received 318 as information describing progress made by the online system 140 towards achieving the reach goal.

Upon identifying 322 information describing progress made by the online system 140 towards achieving each goal associated with the set of content items within the period of time associated with the goal, the online system 140 may update 324 (e.g., using the achievement module 240) information stored in the online system 140 (e.g., in the achievement store 245) that describes progress made by the online system 140 towards achieving the goal. In some embodiments, the online system 140 may do so by updating 324 a count associated with each goal. In such embodiments, the online system 140 may increment a value of a count associated with a goal upon identifying information indicating that progress made by the online system 140 towards achieving the goal has been made during the period of time associated with the goal. For example, suppose that a set of content items is associated with an impression goal that the online system 140 has guaranteed will be achieved within a specified month. In this example, each time the online system 140 identifies 322 information received 318 by the online system 140 describing progress made by the online system 140 towards achieving the impression goal during the specified month, the online system 140 may increment an impression count associated with the impression goal that is stored in the achievement store 245. In the above example, suppose that the content item also is associated with a reach goal that the online system 140 has guaranteed also will be achieved within the specified month. In this example, upon incrementing the impression count associated with the impression goal, if the online system 140 also identifies 322 the information received 318 by the online system 140 as information describing progress made by the online system 140 towards achieving the reach goal, the online system 140 also may increment a reach count associated with the reach goal that is stored in the achievement store 245.

The online system 140 then computes 326 (e.g., using the normalization module 250) one or more normalized ratios used to track the performance of the set of content items. The online system 140 may compute 326 the normalized ratios at periodic time intervals during the period of time in which the goals associated with the set of content items are to be achieved. For example, if a set of content items is associated with an impression goal and a reach goal that are to be achieved within a specified week, the online system 140 may compute 326 a normalized ratio once every hour within the specified week. The online system 140 may compute 326 the normalized ratio based on the goals associated with the set of content items and on the progress made by the online system 140 towards achieving the goals. In some embodiments, the online system 140 may compute 326 the normalized ratio as a ratio of an achievement ratio to a goal ratio. For example, if an achievement ratio has a value of 1 and a goal ratio has a value of 0.5, the online system 140 may compute 326 a normalized ratio to have a value of 2 (i.e., 1/0.5).

The online system 140 may compute a goal ratio to be a ratio of one goal associated with the set of content items to another goal associated with the set of content items. For example, the online system 140 may access the goal store 230 to retrieve information describing a reach goal and an impression goal associated with a set of content items. In this example, if the reach goal associated with the set of content items is to present the content items to at least 200 different online system users and the impression goal associated with the set of content items is to achieve at least 1,000 impressions of the content items, the online system 140 may compute the goal ratio to have a value of 0.2 (i.e., 200/1,000).

Similarly, the online system 140 may compute an achievement ratio to be a ratio of the progress made by the online system 140 towards achieving one goal associated with the set of content items to progress made by the online system 140 towards achieving another goal associated with the set of content items. In the above example, the online system 140 may access the achievement store 245 to retrieve information describing progress made by the online system 140 towards achieving the reach goal and the impression goal. In this example, if a reach count associated with the reach goal indicates that the set of content items has been presented 316 to 300 different online system users and an impression count associated with the impression goal indicates that the content items have achieved 600 impressions, the online system 140 may compute the achievement ratio to have a value of 0.5 (i.e., 300/600).

In alternative embodiments, the online system 140 may compute 326 a normalized ratio in a different manner. In embodiments in which the online system 140 guarantees achievement of one or more types of goals that are different from those just described, the online system 140 may compute 326 the normalized ratio based on the types of goals and on the progress made by the online system 140 towards achieving the corresponding types of goals. For example, if a set of content items is associated with a click goal and a conversion goal, the online system 140 may compute a goal ratio to be a ratio of the conversion goal to the click goal and an achievement ratio to be a ratio of achieved conversions to achieved clicks. In this example, the online system 140 may then compute 326 the normalized ratio to be a ratio of the achievement ratio to the goal ratio. In some embodiments, at least some of the ratios may be expressed as inverses of the ratios described in the above examples. For example, the online system 140 may compute 326 the normalized ratio to be a ratio of the goal ratio to the achievement ratio. As an additional example, the online system 140 may compute the achievement ratio to be a ratio of the achieved impressions to the achieved reach, and the goal ratio to be a ratio of the impression goal to the reach goal.

In some embodiments, once the online system 140 has computed 326 one or more normalized ratios, the online system 140 may plot 328 (e.g., using the graphing module 255) each normalized ratio as a function of time on a graph. For example, if the online system 140 computes 326 a normalized ratio at a particular time, the online system 140 may plot 328 a point on a two-dimensional graph, in which the point has a y-coordinate corresponding to the normalized ratio and an x-coordinate corresponding to the time at which the normalized ratio was computed 326. In this example, the online system 140 also may plot 328 a point corresponding to each normalized ratio subsequently computed 326 by the online system 140 on the same graph. In some embodiments, once the online system 140 has plotted 328 multiple points on a graph corresponding to multiple normalized ratios as a function of time, the online system 140 also may generate a "trend line" that best fits the points. For example, the online system 140 may generate a trend line that best fits multiple points plotted 328 on a graph that correspond to multiple normalized ratios, such that the trend line shows a general direction in which the normalized ratio seems to be heading over time.

In addition to plotting 328 one or more points corresponding to normalized ratios as a function of time on a graph, the online system 140 also may generate 330 (e.g., using the graphing module 255) one or more curves on the same graph corresponding to threshold values associated with the goals. Curves generated 330 by the online system 140 may include one or more over-delivery curves that correspond to a trend of normalized ratios that may result in achievement of one goal associated with the set of content items, but not another goal associated with the set of content items within the period of time in which the goals are to be achieved. For example, if a set of content items is associated with an impression goal and a reach goal, the online system 140 may generate 330 a reach over-delivery curve that corresponds to a trend of normalized ratios that may result in achievement of the reach goal, but not the impression goal within a period of time in which the goals are to be achieved. In this example, the online system 140 also may generate 330 an impression over-delivery curve that corresponds to a trend of normalized ratios that may result in achievement of the impression goal, but not the reach goal within the period of time in which the goals are to be achieved. In embodiments in which the set of content items are associated with other types of goals, the curves generated 330 by the online system 140 also may include other types of over-delivery curves corresponding to threshold values associated with the types of goals (e.g., a conversion over-delivery curve, a click over-delivery curve, etc.).

In some embodiments, the curves generated 330 by the online system 140 also may include a target curve and a tolerance threshold curve. A target curve may correspond to a trend of normalized ratios that may result in achievement of both goals associated with the set of content items within the period of time in which the goals are to be achieved. For example, if a set of content items is associated with a reach goal and an impression goal, the online system 140 may generate 330 a target curve that corresponds to a trend of normalized ratios that may result in achievement of both goals within a period of time in which the goals are to be achieved. In embodiments in which the online system 140 generates 330 one or more over-delivery curves and a target curve, all of the curves may intersect at a point corresponding to an end of a period of time in which multiple goals associated with a set of content items are to be achieved. For example, suppose that a set of content items is associated with an impression goal and a reach goal that are to be achieved within a specified month. In this example, if the online system 140 generates (in step 330) curves on a two-dimensional graph, in which the y-axis represents normalized ratios and the x-axis represents time, the curves generated 330 by the online system 140 may include a reach over-delivery curve, an impression over-delivery curve, and a target curve that intersect at a point on the graph having an x-coordinate that corresponds to the end of the specified month. In embodiments in which the online system 140 generates 330 a tolerance threshold curve, points along the tolerance threshold curve may correspond to a trend of normalized ratios that may result in an over-achievement of a goal that is tolerated. For example, if a set of content items is associated with a reach goal and an impression goal, since it is often more difficult to achieve reach goals than impression goals, the online system 140 may generate 330 a tolerance threshold curve that may indicate that achievement of a greater reach than is required by the reach goal will be tolerated to ensure that the reach goal is achieved.

In embodiments in which the online system 140 generates 330 one or more curves corresponding to threshold values associated with the goals, the online system 140 may generate 330 the curves based on various types of information. For example, in a two-dimensional graph, in which the x-axis represents time and the y-axis represents normalized ratios, the online system 140 may designate a point having the coordinates (1, 1) to correspond to the end of a period of time associated with a reach goal and an impression goal associated with a set of content items at which both goals have been achieved (i.e., a normalized ratio of 1 at time t=1). In this example, since a target curve generated 330 by the online system 140 will have a normalized ratio of 1 at all times during the period of time associated with the goals, the target curve will correspond to a straight line having an equation of y=1.

In some embodiments, the online system 140 may generate 330 one or more curves included in a graph based on historical data maintained in the online system 140 (e.g., historical impression data and/or historical reach data). For example, if the online system 140 has generated 330 a target curve corresponding to a straight line having an equation of y=1, the online system 140 also may generate (in step 330) lines corresponding to a reach over-delivery curve and an impression over-delivery curve that intersect the target curve at the point having the coordinates (1,1) corresponding to the end of the period of time at which the goals are to be achieved. In this example, the online system 140 may determine a y-intercept and/or a slope of the impression over-delivery curve and the reach over-delivery curve based on historical impression and reach data for various content items having at least a threshold measure of similarity to the set of content items during time intervals that are the same as or similar to the period of time associated with the goals. In the above example, the online system 140 also may predict a threshold normalized ratio at which a likelihood that the reach goal will be achieved by the end of the period of time associated with the goals is at least a threshold likelihood (e.g., based on the historical reach data). In this example, if the online system 140 predicts the threshold normalized ratio to be 1.1, the online system 140 may generate 330 a tolerance threshold curve that is a straight line having an equation of y=1.1. In some embodiments, the online system 140 also may generate 330 one or more of the curves using a machine-learning model. In the above examples, the online system 140 may train a machine-learning model using the historical impression and reach data. In these examples, the online system 140 subsequently may generate 330 one or more of the curves using the model.

Each time the online system 140 computes 326 a normalized ratio, the online system 140 compares 332 (e.g., using the filter evaluation module 265) one or more points on a graph corresponding to normalized ratios computed 326 by the online system 140 to one or more curves corresponding to threshold values associated with the goals. Based on the comparison, the online system 140 determines 334 (e.g., using the filter evaluation module 265) whether the value of a filter associated with the set of content items should be adjusted in order to achieve the goals associated with the content items within the period of time guaranteed by the online system 140. In some embodiments, if a point on the graph corresponding to a current normalized ratio is on one side of different over-delivery curves, the online system 140 may determine 334 that the values of one or more filters should be adjusted. For example, if a set of content items is associated with an impression goal and a reach goal and a point on a graph corresponding to a current normalized ratio is on one side of an impression over-delivery curve and a reach over-delivery curve, the online system 140 may determine 334 that the value of a reach filter and/or an impression filter associated with a set of content items should be adjusted.

When the online system 140 compares 332 one or more points on a graph corresponding to normalized ratios computed 326 by the online system 140 to one or more curves, if a point on the graph corresponding to a current normalized ratio is between an over-delivery curve and a target curve, the online system 140 may determine whether the current normalized ratio is improving (i.e., approaching the target curve) or deteriorating (i.e., deviating from the target curve). The online system 140 may do so by comparing 332 the point to a point corresponding to an additional normalized ratio that previously was computed 326 for the set of content items. For example, suppose that at time t=0.2, the normalized ratio is computed 326 to be 1.1, such that a point on a graph corresponding to this first normalized ratio has the coordinates (0.2, 1.1) and that subsequently, at time t=0.25, the normalized ratio is computed 326 to be 1.3, such that a point on the graph corresponding to this second normalized ratio has the coordinates (0.25, 1.3). In this example, if the online system 140 determines that the point corresponding to the second normalized ratio is between a target curve having an equation of y=1 and a reach over-delivery curve, the online system 140 may then determine that the normalized ratio is deteriorating by comparing the coordinates of this point to the coordinates of the point corresponding to the first normalized ratio and to the target curve. As an additional example, suppose that at time t=0.1, the normalized ratio is computed 326 to be 1.4, such that a point on a graph corresponding to this first normalized ratio has the coordinates (0.1, 1.4) and that subsequently, at time t=0.15, the normalized ratio is computed 326 to be 1.3, such that a point on the graph corresponding to this second normalized ratio has the coordinates (0.15, 1.3). In this example, if the online system 140 determines that the point corresponding to the second normalized ratio is between a target curve having an equation of y=1 and a reach over-delivery curve, the online system 140 may then determine that the normalized ratio is improving by comparing the coordinates of this point to the coordinates of the point corresponding to the first normalized ratio and to the target curve.

The online system 140 may determine 334 whether the value of a filter associated with the set of content items needs to be adjusted based at least in part on whether the normalized ratio is improving or deteriorating. In embodiments in which the online system 140 has determined that the normalized ratio is deteriorating, the online system 140 may determine 334 that the value of a filter associated with the set of content items needs to be adjusted. In embodiments in which the normalized ratio is improving, the online system 140 may determine 334 whether the values of the impression filter and/or the reach filter associated with the set of content items need to be adjusted based on a trend of points corresponding to normalized ratios computed 326 by the online system 140. For example, the online system 140 may plot 328 multiple points corresponding to the current normalized ratio and normalized ratios previously computed 326 by the online system 140 and generate a "trend line" that best fits the points. In this example, if the trend line intersects the target curve at a point along the trend line corresponding to the end of a period of time in which an impression goal and a reach goal are to be achieved, the online system 140 may determine 334 that the values of the corresponding filters do not need to be adjusted.

Figure 4A:
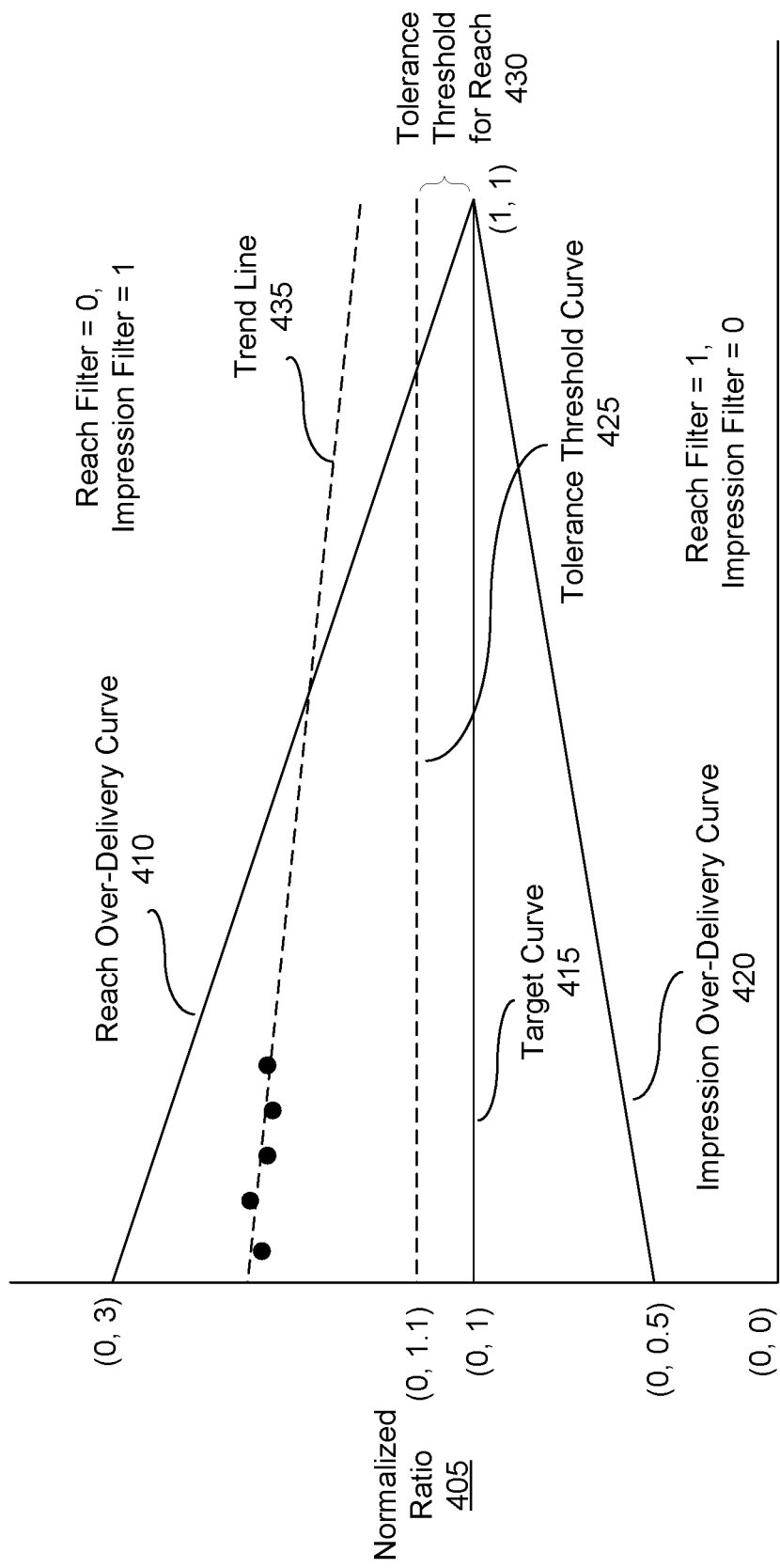
FIGS. 4A-4D are example graphs that may be used by the online system to adjust a value of a filter that controls a number of impression opportunities for which a set of content items associated with a goal will be eligible for presentation to viewing users of the online system, in accordance with an embodiment.

In some embodiments, the online system 140 also may determine 334 whether the value of a filter associated with the set of content items needs to be adjusted based at least in part on a tolerance threshold curve. In the above example, if a tolerance threshold allows for slight over-achievement of the reach goal and the trend line intersects a region bounded by a tolerance threshold curve corresponding to the tolerance threshold and the target curve at the point along the trend line corresponding to the end of the period of time associated with the goals, the online system 140 also may determine 334 that the values of the filters do not need to be adjusted. In the above examples, if the trend line does not intersect the target curve or does not intersect the region bounded by the tolerance threshold curve and the target curve at the point along the trend line corresponding to the end of the period of time associated with the goals, the online system 140 may determine 334 that the value of a filter associated with a set of content items needs to be adjusted. As shown in the example of FIG. 4A, a tolerance threshold for reach 430 allows for slight over-achievement of a reach goal and a trend line 435 does not intersect a region bounded by a tolerance threshold curve 425 corresponding to the tolerance threshold for reach 430 and a target curve 415 at a point along the trend line 435 corresponding to the end of a period of time associated with the goals (i.e., the point along the trend line 435 having an x-coordinate of 1). Therefore, in this example, the online system 140 may determine 334 that the values of the filters need to be adjusted.

Referring back to FIG. 3, the online system 140 may proceed differently depending on whether it has determined 334 that the values of one or more filters associated with the set of content items need to be adjusted. In embodiments in which the online system 140 has determined 334 that the values of the filters do not need to be adjusted, the online system 140 may repeat some of the steps described above (e.g., by proceeding back to the selecting 312 one or more content items for presentation to viewing users of the online system 140 step, etc.). Alternatively, if the online system 140 has determined 334 that the values of one or more filters associated with the set of content items need to be adjusted, the online system may identify 336 (e.g., using the filter evaluation module 265) one or more filters having values that need to be adjusted.

In embodiments in which the online system 140 has determined that the normalized ratio is deteriorating, the online system 140 may identify 336 a filter having a value that needs to be adjusted by comparing 332 a distance between a point corresponding to the current normalized ratio and a point corresponding to each of the over-delivery curves 410, 420. For example, if a normalized ratio is deteriorating and a point on a graph corresponding to the current normalized ratio is closer to a point along a reach over-delivery curve 410 corresponding to a current time than to a point along an impression over-delivery curve 420 corresponding to the current time, the online system 140 may identify 336 the reach filter as the filter having the value that needs to be adjusted. Alternatively, in the above example, if the point on the graph is closer to the point along the impression over-delivery curve 420 corresponding to the current time than to the point along the reach over-delivery curve 410 corresponding to the current time, the online system 140 may identify 336 the impression filter as the filter having the value that needs to be adjusted.

Similarly, in embodiments in which the online system 140 has determined 334 that the normalized ratio is improving, but that the value of a filter associated with the set of content items needs to be adjusted, the online system 140 may identify 336 the filter that needs to be adjusted. As described above, the online system 140 may identify 336 a filter that needs to be adjusted by comparing 332 a distance between a point corresponding to the current normalized ratio and a point along each of the over-delivery curves 410, 420. For example, if a normalized ratio is improving and a point on a graph corresponding to the current normalized ratio is closer to a point along a reach over-delivery curve 410 corresponding to a current time than to a point along an impression over-delivery curve 420 corresponding to the current time, the online system 140 may identify 336 the reach filter as the filter having the value that needs to be adjusted. Alternatively, in the above example, if the point on the graph corresponding to the current normalized ratio is closer to the point along the impression over-delivery curve 420 corresponding to the current time than to the point along the reach over-delivery curve 410 corresponding to the current time, the online system 140 may identify 336 the impression filter as the filter having the value that needs to be adjusted.

The online system 140 then determines 338 (e.g., using the filter adjustment module 270) an amount by which to adjust the values of one or more filters and adjust 340 (e.g., using the filter adjustment module 270) the values accordingly. The online system 140 may adjust 340 the value of a filter associated with the set of content items to a value that would increase the likelihood that a normalized ratio that subsequently is computed 326 by the online system 140 will approach the target curve 415, hence also increasing the likelihood that the goals will be achieved within the period of time guaranteed by the online system 140.

Figure 4B:
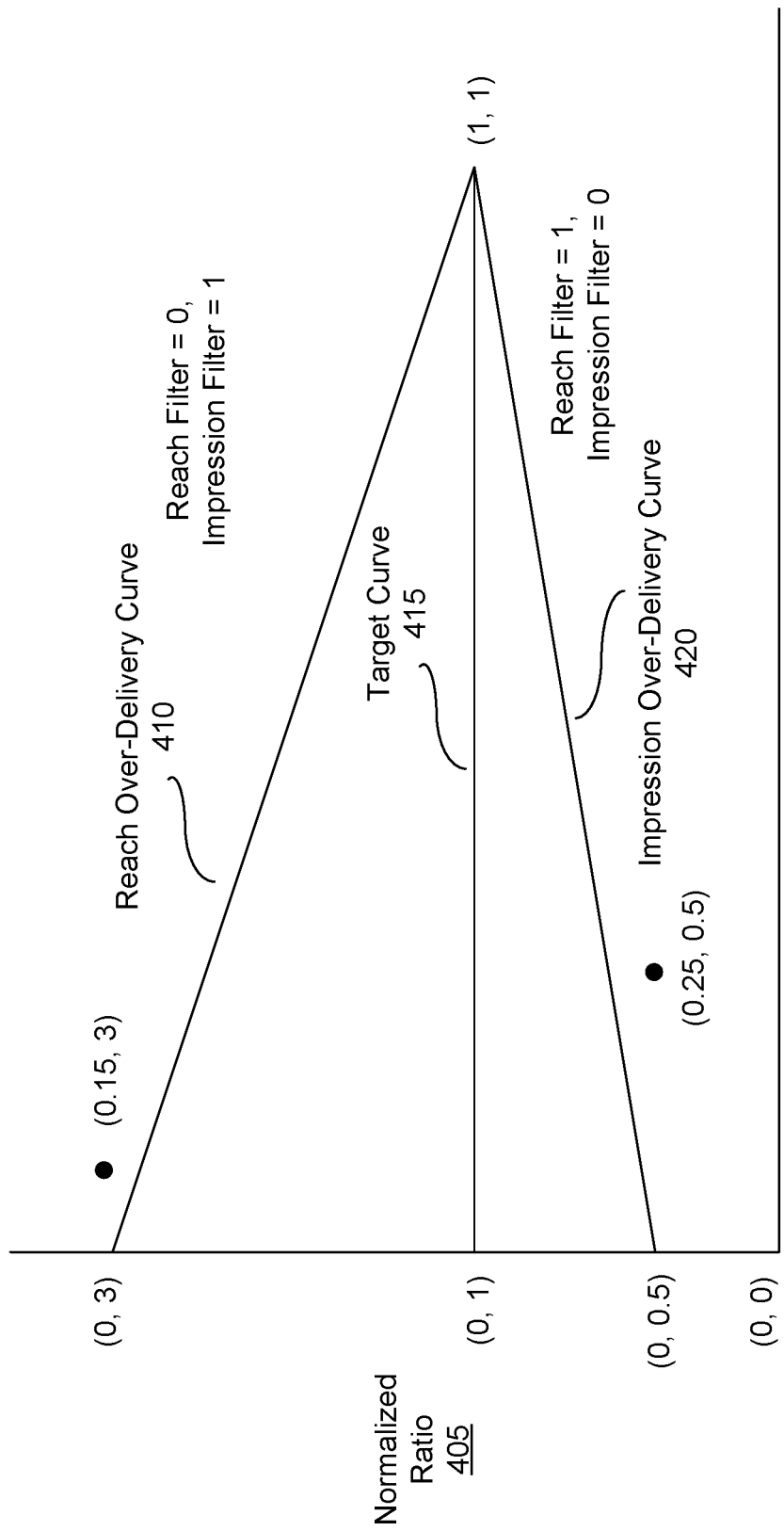

In embodiments in which the online system 140 has determined that a point on a graph corresponding to a current normalized ratio is on one side of different over-delivery curves 410, 420, the online system 140 may determine 338 that the values of one or more filters should be adjusted to one or more base values and adjust 340 the values accordingly. For example, as illustrated in FIG. 4B, suppose that a set of content items is associated with an impression goal and a reach goal and that a point on a graph corresponding to a current normalized ratio has the coordinates (0.15, 3) and that the point is on one side of a reach over-delivery curve 410 and an impression over-delivery curve 420 and is closer to the reach over-delivery curve 410 than to the impression over-delivery curve 420. In this example, if values of filters correspond to probabilities, the online system 140 may determine 338 that the value of a reach filter associated with the set of content items should be adjusted to a base value of 0 and that the value of an impression filter should be adjusted to a base value of 1 and adjust 340 the values of the filters accordingly.

In the above example, if the point on the graph corresponding to the current normalized ratio had the coordinates (0.25, 0.5), the point would still be on one side of the impression over-delivery curve 420 and the reach over-delivery curve 410, but would be closer to the impression over-delivery curve 420 than to the reach over-delivery curve 410. In this example, the online system 140 may determine 338 that the value of the reach filter associated with the set of content items should be adjusted to a base value of 1 and that the value of the impression filter should be adjusted to a base value of 0 and adjust 340 the values of the filters accordingly. In the above example, if the online system 140 had determined 334 that the value of any other type of filter associated with a set of content items needed to be adjusted, the online system 140 may determine 338 an amount by which to adjust the value and adjust 340 the value of the filter in an analogous manner.

Figure 4C:
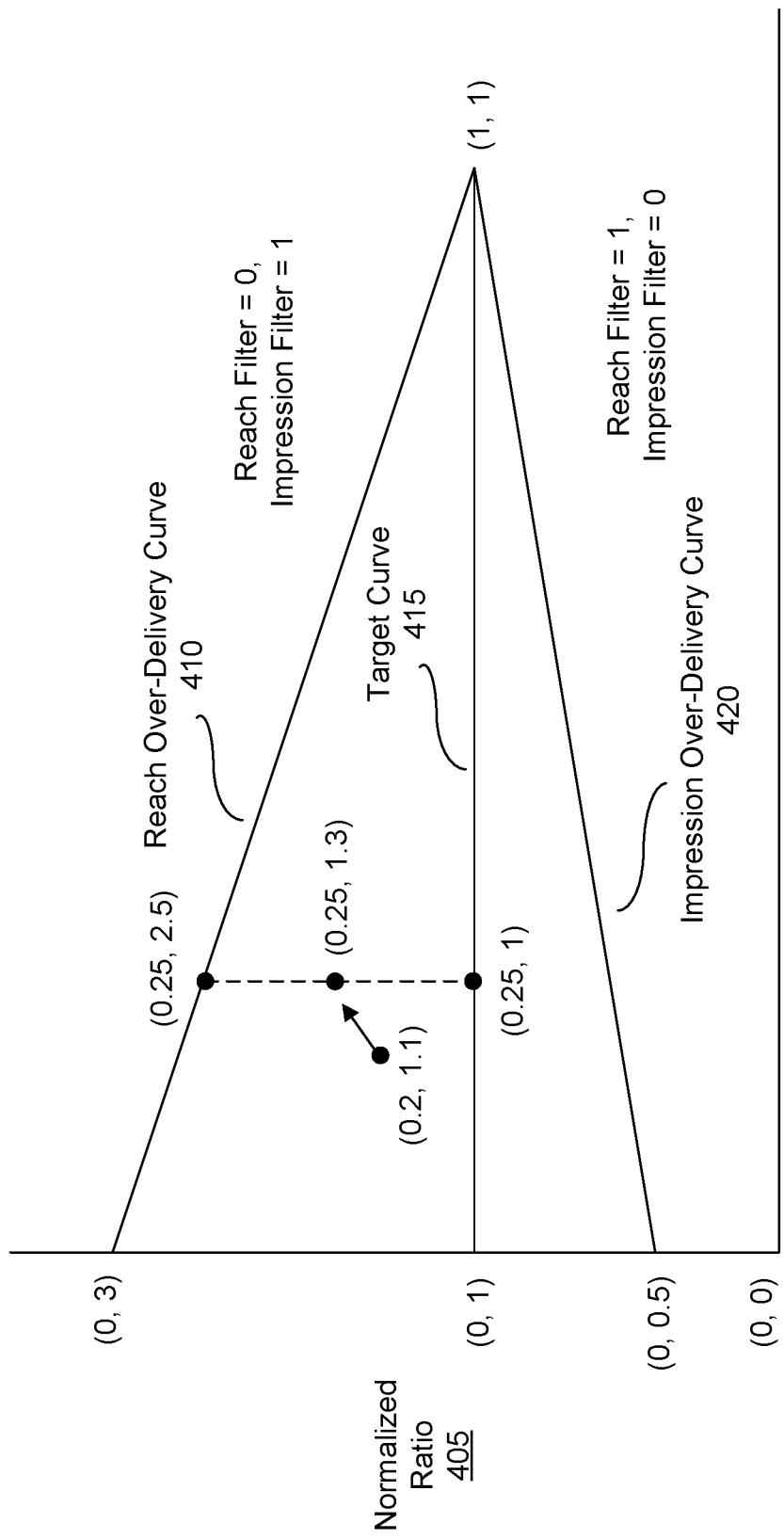

In embodiments in which the normalized ratio is deteriorating, once the online system 140 has identified 336 a filter having a value that needs to be adjusted, the online system 140 may determine 338 the amount by which to adjust the value of the filter based at least in part on a difference between the current normalized ratio and a threshold value corresponding to an over-delivery curve 410, 420. As shown in the example of FIG. 4C, suppose that a point on a graph corresponding to a first normalized ratio has the coordinates (0.2, 1.1), a point on the graph corresponding to a second normalized ratio, which is the current normalized ratio, has the coordinates (0.25, 1.3), and the current value of a reach filter is 0.6. Suppose also that the online system 140 has determined that the point corresponding to the second normalized ratio is between a target curve 415 having an equation of y=1 and a reach over-delivery curve 410, that the normalized ratio is deteriorating, and that the value of a reach filter associated with a set of content items needs to be adjusted. In this example, the online system 140 may determine coordinates at which a vertical line passing through the point corresponding to the second normalized ratio would intersect the reach over-delivery curve 410 and the target curve 415 (e.g., (0.25, 2.5) and (0.25, 1), respectively). In this example, the online system 140 may then compute a weight based on the coordinates (e.g., weight=1−((y-coordinate of point−y-coordinate of reach over-delivery curve)/(y-coordinate of target curve−y-coordinate of reach over-delivery curve))=1−((1.3−2.5)/(1−2.5))=0.2). The online system 140 may then adjust 340 the current value of the reach filter (i.e., 0.6) to a new value based on the weight (e.g., new reach filter=minimum reach filter+weight*(current reach filter−minimum reach filter)=0+0.2*(0.6−0)=0.12. In the above example, if the online system 140 had determined 334 that the value of an impression filter or any other type of filter associated with a set of content items needed to be adjusted, the online system 140 may determine 338 an amount by which to adjust the value and adjust 340 the value of the filter in an analogous manner.

Figure 4D:
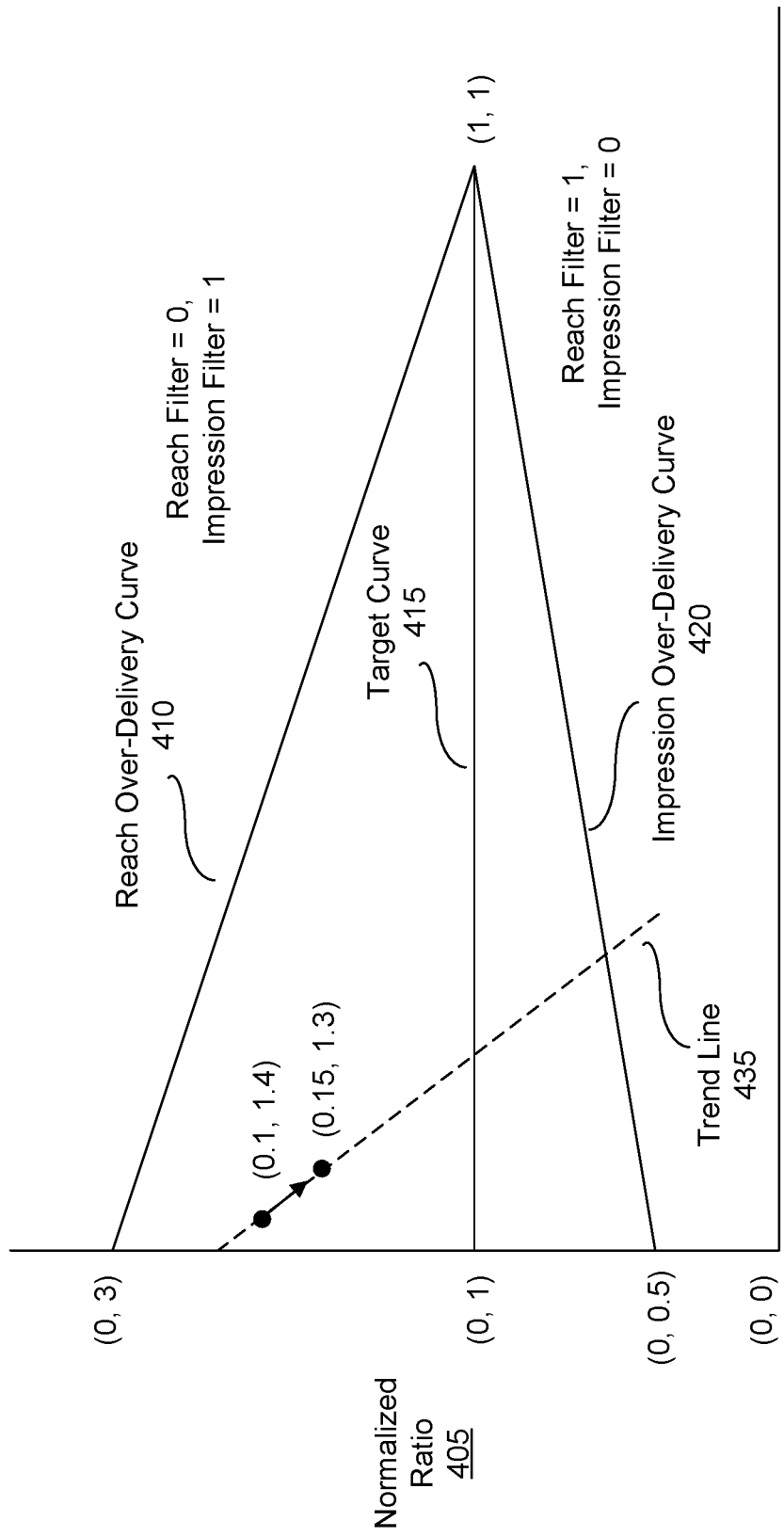

Referring again to FIG. 3, in embodiments in which the online system 140 determines 338 that the normalized ratio is improving, but that the value of a filter associated with the set of content items needs to be adjusted and has identified 336 the filter having the value to be adjusted, the online system 140 may then determine 338 an amount by which to adjust the value of the filter. The online system 140 may determine 338 an amount by which to adjust the value of a filter based at least in part on a complement of the current value of the filter. For example, as shown in FIG. 4D, suppose that the online system 140 has determined 334 that the normalized ratio is improving (based on a comparison of the coordinates (0.1, 1.4) to the coordinates (0.15, 1.3)), and that the value of a reach filter associated with a set of content items needs to be adjusted from its current value of 0.3 (since a trend line 435 does not intersect a target curve 415 at a point along the trend line 435 corresponding to the end of a period of time associated with the goals (i.e., the point along the trend line 435 having an x-coordinate of 1)). In this example, the online system 140 may determine a complement of the current value of the reach filter (i.e., 1−0.3=0.7). Continuing with this example, the online system 140 may add a fraction of the complement to the current value of the reach filter to obtain the new value of the reach filter. In this example, if the fraction of the complement is 10% (i.e., 0.1), the new value of the reach filter may be computed to be the following: new reach filter=current reach filter+((1−current reach filter)*fraction))=0.3+(0.7*0.1)=0.37. In the above example, the fraction of the complement may be set to a default value or may be determined by a machine-learning model. Furthermore, in the above example, if the online system 140 had determined 334 that the value of an impression filter or any other type of filter associated with the set of content items needed to be adjusted, the online system 140 may determine 338 an amount by which to adjust the value and adjust 340 the value of the filter in an analogous manner.

In some embodiments, once a goal associated with the set of content items is achieved, the online system 140 may adjust 340 the value of a filter corresponding to the goal to a minimum value, such that the number of impression opportunities for which the online system 140 will consider presenting 316 one or more content items included among the set of content items to a viewing user of the online system 140 may be minimized. For example, suppose that a set of content items is associated with an impression goal and a reach goal and that values of filters associated with the set of content items correspond to probabilities. In this example, once the impression goal is achieved, the online system 140 may adjust 340 the value of an impression filter associated with the set of content items to 0. In the above example, once the reach goal is achieved, the online system 140 also may adjust 340 the value of a reach filter associated with the set of content items to 0. Alternatively, in embodiments in which a tolerance threshold curve allows for slight over-achievement of a goal, a filter corresponding to the goal may remain the same or may be adjusted 340 by a different amount (e.g., to a value between the current value and 0) once the goal is achieved.

Referring once more to FIG. 3, in embodiments in which the goals associated with the set of content items have not yet been achieved within the period of time associated with the goals, the online system 140 may repeat some of the steps described above (e.g., by storing 310 the adjusted values of one or more filters associated with the set of content items, etc.).

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining, at an online system, a set of content items associated with a first goal corresponding to a first type of content delivery and a second goal corresponding to a second type of content delivery provided by a content-providing user of the online system, the goals associated with a period of time in which the goals are to be achieved;
   presenting one or more of the set of content items to users of the online system during the period of time using a first filter value corresponding to the first type of content delivery and a second filter value corresponding to the second type of content delivery, the first and second filter values respectively indicating a probability that one or more content items from the set of content items will be selected for the first or second type of content delivery to a user of the online system;
   receiving a first count indicating progress towards the first goal and a second count indicating progress towards the second goal based on the presentation of the content items on one or more client devices of users of the online system, wherein each of the counts is tracked by an action logger that uses internet protocol (IP) address information associated with the one or more client devices;
   for each of one or more times within the period of time associated with the goals:
   computing a normalized ratio for the set of content items, wherein the normalized ratio is a ratio of an achievement ratio to a goal ratio, the goal ratio comparing the first goal and the second goal, the achievement ratio comparing the first count and the second count;
   comparing the normalized ratio to a predetermined first over-delivery value associated with the first type of content delivery and a predetermined second over-delivery value associated with the second type of content delivery, the predetermined first and second over-delivery values corresponding to a current time;
   determining, based on the comparison, that a difference between the normalized ratio and the predetermined first over-delivery value is less than a predetermined threshold difference;
   adjusting, based on the determined difference, the first filter value to increase a likelihood that the normalized ratio approaches a target normalized ratio corresponding to a successful achievement of the first and second goals during the time period;
   selecting one or more content items for presentation on a client device of a user of the online system based on the adjusted first filter value; and
   presenting the selected one or more content items to the user in a display area of the client device.

2. The method of claim 1, wherein the first and second type of content delivery comprise one of: a number of impressions to be achieved within the period of time or a number of unique users of the online system to whom the set of content items are to be presented within the period of time.

3. The method of claim 1, wherein the first count and second count comprise one or more of: a number of impressions achieved by the set of content items or a number of unique users of the online system to whom the set of content items has been presented.

4. The method of claim 1, wherein adjusting the first filter value comprises:
   generating a graph comprising at least a point corresponding to the normalized ratio and a time at which the normalized ratio was computed and one or more over-delivery curves corresponding to the predetermined first and second over-delivery values associated with the first and second goals.

5. The method of claim 4, wherein the one or more over-delivery curves comprise one or more of: a reach over-delivery curve, an impression over-delivery curve, a predetermined target curve describing the target normalized ratio, or a tolerance threshold curve.

6. The method of claim 4, wherein adjusting the first filter value comprises:
   plotting one or more additional points on the graph, each of the one or more additional points corresponding to each of one or more additional normalized ratios and a respective time at which each of the one or more additional normalized ratios was computed;
   generating a trend line that best fits the point and the one or more additional points; and
   determining whether the normalized ratio is improving or deteriorating based at least in part on whether the trend line is approaching or deviating from the target curve.

7. The method of claim 4, wherein adjusting the first filter value comprises:
   determining that the first filter value corresponding to the first type of content delivery should be adjusted if the normalized ratio is greater than one or more threshold values corresponding to the one or more over-delivery curves.

8. The method of claim 5, wherein adjusting the first filter value comprises:
   determining that the first filter value corresponding to the first type of content delivery should be adjusted if the normalized ratio is less than one or more threshold values corresponding to the one or more over-delivery curves.

9. The method of claim 6, wherein adjusting the first filter value comprises:
   responsive to determining that the normalized ratio is improving:
   determining that the first filter value corresponding to the first type of content delivery should not be adjusted if the target curve is intersected by the trend line at a coordinate along the trend line corresponding to an end of the period of time associated with the first and second goal; and
   determining that the first filter value corresponding to the first type of content delivery should be adjusted if the target curve is not intersected by the trend line at the coordinate along the trend line corresponding to the end of the period of time.

10. The method of claim 6, adjusting the first filter value comprises:
responsive to determining that the normalized ratio is deteriorating, determining that the first filter value of the filter corresponding to the first type of content delivery should be adjusted.

11. The method of claim 1, wherein an amount by which to adjust the first filter value is determined based at least in part on one or more of: a base value of the first filter value, a current value of the first filter value, a complement of the current value of the first filter value, or a difference between the normalized ratio and the predetermined first over-delivery value.

12. A computer program product comprising a computer readable storage medium having instructions encoded thereon that, when executed by a processor, cause the processor to:
maintain, at an online system, a set of content items associated with a first goal corresponding to a first type of content delivery and a second goal corresponding to a second type of content delivery provided by a content-providing user of the online system, the goals associated with a period of time in which the goals are to be achieved;
present one or more of the set of content items to users of the online system during the period of time using a first filter value corresponding to the first type of content delivery and a second filter value corresponding to the second type of content delivery, the first and second filter values respectively indicating a probability that one or more content items from the set of content items will be selected for the first or second type of content delivery to a user of the online system;
receive a first count indicating progress towards the first goal and a second count indicating progress towards the second goal based on the presentation of the content items on one or more client devices of users of the online system, wherein each of the counts is tracked by an action logger that uses internet protocol (IP) address information associated with the one or more client devices;
for each of one or more times within the period of time associated with the goals:
compute a normalized ratio for the set of content items, wherein the normalized ratio is a ratio of an achievement ratio to a goal ratio, the goal ratio comparing the first goal and the second goal, the achievement ratio comparing the first count and the second count;
compare the normalized ratio to a predetermined first over-delivery value associated with the first type of content delivery and a predetermined second over-delivery value associated with the second type of content delivery, the predetermined first and second over-delivery values corresponding to a current time;
determine, based on the comparison, that a difference between the normalized ratio and the predetermined first over-delivery value is less than a predetermined threshold difference;
adjust, based on the determined difference, the first filter value to increase a likelihood that the normalized ratio approaches a target normalized ratio corresponding to a successful achievement of the first and second goals during the time period;
select one or more content items for presentation on a client device of a user of the online system based on the adjusted first filter value; and
present the selected one or more content items to the user in a display area of the client device.

13. The computer program product of claim 12, wherein the first and second type of content delivery comprise one of: a number of impressions to be achieved within the period of time or a number of unique users of the online system to whom the set of content items are to be presented within the period of time.

14. The computer program product of claim 12, wherein the first count and second count comprise one or more of: a number of impressions achieved by the set of content items or a number of unique users of the online system to whom the set of content items has been presented.

15. The computer program product of claim 12, wherein the instructions to adjust the first filter value further comprises instructions to:
generate a graph comprising at least a point corresponding to the normalized ratio and a time at which the normalized ratio was computed and one or more over-delivery curves corresponding to the predetermined first and second over-delivery values associated with the first and second goals.

16. The computer program product of claim 15, wherein the one or more over-delivery curves comprise one or more of: a reach over-delivery curve, an impression over-delivery curve, a predetermined target curve describing the target normalized ratio, or a tolerance threshold curve.

17. The computer program product of claim 15, wherein the instructions to adjust the first filter value further comprise instructions to:
plot one or more additional points on the graph, each of the one or more additional points corresponding to each of one or more additional normalized ratios and a respective time at which each of the one or more additional normalized ratios was computed;
generate a trend line that best fits the point and the one or more additional points; and
determine whether the normalized ratio is improving or deteriorating based at least in part on whether the trend line is approaching or deviating from the target curve.

18. The computer program product of claim 16, wherein the instructions to adjust the first filter value further comprise instructions to:
determine that the first filter value corresponding to the first type of content delivery should be adjusted if the normalized ratio is greater than one or more threshold values corresponding to the one or more over-delivery curves.

19. The computer program product of claim 16, wherein the instructions to adjust the first filter value further comprise instructions to:
determine that the first filter value corresponding to the first type of content delivery should be adjusted if the normalized ratio is less than one or more threshold values corresponding to the one or more over-delivery curves.

20. The computer program product of claim 17, wherein the instructions to adjust the first filter value further comprise instructions to:
responsive to determining that the normalized ratio is improving:
determine that the first filter value corresponding to the first type of content delivery should not be adjusted if the target curve is intersected by the trend line at a coordinate along the trend line corresponding to an end of the period of time associated with the first and second goal; and determine that the first filter value corresponding to the first type of content delivery should be adjusted if the target curve is not intersected by the trend line at the coordinate along the trend line corresponding to the end of the period of time.

21. The computer program product of claim 17, wherein the instructions to adjust the first filter value further comprise instructions to:

responsive to determining that the normalized ratio is deteriorating, determine that the first filter value of the filter corresponding to the first type of content delivery should be adjusted.

22. The computer program product of claim 13, an amount by which to adjust the first filter value is determined based at least in part on one or more of: a base value of the first filter value, a current value of the first filter value, a complement of the current value of the first filter value, or a difference between the normalized ratio and the predetermined first over-delivery value.

23. A method comprising:

maintaining, at an online system, a set of content items associated with a first goal corresponding to a first type of content delivery and a second goal corresponding to a second type of content delivery provided by a content-providing user of the online system, the goals associated with a period of time in which the goals are to be achieved;

presenting one or more of the set of content items to users of the online system during the period of time using a first filter value corresponding to the first type of content delivery and a second filter value corresponding to the second type of content delivery, the first and second filter values respectively indicating a probability that one or more content items from the set of content items will be selected for the first or second type of content delivery to a user of the online system;

receiving a first count indicating progress towards the first goal and a second count indicating progress towards the second goal based on the presentation of the content items on one or more client devices of users of the online system, wherein each of the counts is tracked by an action logger that uses internet protocol (IP) address information associated with the one or more client devices;

computing a normalized ratio for the set of content items, the normalized ratio comparing the first goal, the second goal, the first count, and the second count;

comparing the normalized ratio to a predetermined first over-delivery value associated with the first type of content delivery and a predetermined second over-delivery value associated with the second type of content delivery, the predetermined first and second over-delivery values corresponding to a current time;

determining, based on the comparison, that a difference between the normalized ratio and the predetermined first or second over-delivery value is less than a predetermined threshold difference;

adjusting, based on the determined difference, the first or second filter value to increase a likelihood that the normalized ratio approaches a target normalized ratio corresponding to a successful achievement of the first and second goals during the time period;

selecting one or more content items for presentation on a client device of a user of the online system based on the adjusted first filter value; and presenting the selected one or more content items to the user in a display area of the client device.

\* \* \* \* \*